US010925040B2

(12) United States Patent
Zhou

(10) Patent No.: US 10,925,040 B2
(45) Date of Patent: Feb. 16, 2021

(54) METHOD AND DEVICE FOR TRANSMITTING SOUNDING REFERENCE SIGNAL, CHIP AND USER EQUIPMENT

(71) Applicant: BAICELLS TECHNOLOGIES CO. LTD., Beijing (CN)

(72) Inventor: Mingyu Zhou, Beijing (CN)

(73) Assignee: BAICELLS TECHNOLOGIES CO. LTD., Beijing (CN)

( * ) Notice: Subject to any disclaimer, the term of this patent is extended or adjusted under 35 U.S.C. 154(b) by 204 days.

(21) Appl. No.: 16/079,297

(22) PCT Filed: Feb. 24, 2017

(86) PCT No.: PCT/CN2017/074671
§ 371 (c)(1),
(2) Date: Aug. 23, 2018

(87) PCT Pub. No.: WO2017/144002
PCT Pub. Date: Aug. 31, 2017

(65) Prior Publication Data
US 2019/0053223 A1  Feb. 14, 2019

(30) Foreign Application Priority Data

Feb. 26, 2016 (CN) .......................... 2016 1 0109196

(51) Int. Cl.
*H04W 72/04* (2009.01)
*H04L 5/00* (2006.01)
*H04W 72/12* (2009.01)

(52) U.S. Cl.
CPC ......... *H04W 72/0413* (2013.01); *H04L 5/005* (2013.01); *H04L 5/0007* (2013.01);
(Continued)

(58) Field of Classification Search
None
See application file for complete search history.

(56) References Cited

U.S. PATENT DOCUMENTS

2009/0181687 A1   7/2009  Tiirola et al.
2010/0296480 A1*  11/2010  Nouda ................. H04J 11/00
                                                 370/330
(Continued)

FOREIGN PATENT DOCUMENTS

CN  101500242 A  8/2009
CN  101971550 A  2/2011
(Continued)

OTHER PUBLICATIONS

International Search Report and Written Opinion for International Application No. PCT/CN/2017/074671, dated May 15, 2017 (May 15, 2017)—21 pages.
(Continued)

*Primary Examiner* — Alex Skripnikov
*Assistant Examiner* — Richard Schnell
(74) *Attorney, Agent, or Firm* — Culhane Meadows PLLC; Stephen J. Weed

(57) ABSTRACT

A method and a device for transmitting an SRS, a chip and a LTE are provided. The method includes: acquiring scheduling information of an uplink transmission channel when the uplink transmission channel is being scheduled; determining a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and transmitting the SRS through the resource adopted by the uplink control channel.

17 Claims, 8 Drawing Sheets

(52) U.S. Cl.
CPC .......... *H04L 5/0016* (2013.01); *H04L 5/0051* (2013.01); *H04L 5/0094* (2013.01); *H04W 72/04* (2013.01); *H04W 72/12* (2013.01); *H04W 72/1268* (2013.01); *H04W 72/1284* (2013.01)

(56) References Cited

U.S. PATENT DOCUMENTS

| | | |
|---|---|---|
| 2011/0116436 A1 | 5/2011 | Bachu et al. |
| 2012/0147774 A1 | 6/2012 | Park et al. |
| 2012/0252474 A1 | 10/2012 | Tiirola et al. |
| 2012/0281654 A1 | 11/2012 | Alba et al. |
| 2012/0307779 A1 | 12/2012 | Noh et al. |
| 2013/0114501 A1* | 5/2013 | Kishiyama .......... H04J 13/0059 370/328 |
| 2013/0182618 A1 | 7/2013 | Chen et al. |
| 2013/0294400 A1 | 11/2013 | Liu |
| 2014/0029569 A1* | 1/2014 | Ni ..................... H04L 5/0048 370/330 |
| 2014/0177531 A1* | 6/2014 | Imamura ............. H04L 5/0035 370/328 |
| 2014/0211740 A1 | 7/2014 | Berggren |
| 2015/0223213 A1 | 8/2015 | Moon et al. |
| 2015/0304083 A1* | 10/2015 | Kim ..................... H04L 5/0025 370/329 |
| 2016/0119920 A1* | 4/2016 | Mallik ................. H04W 72/14 370/336 |
| 2017/0230972 A1* | 8/2017 | Wang .................... H04L 5/0048 |
| 2018/0199358 A1* | 7/2018 | Moosavi .......... H04W 72/1268 |

FOREIGN PATENT DOCUMENTS

| | | |
|---|---|---|
| CN | 102469607 A | 5/2012 |
| CN | 102668437 A | 9/2012 |
| CN | 102714869 A | 10/2012 |
| CN | 104170506 A | 11/2014 |
| JP | 2011512705 A | 4/2011 |
| JP | 2012526491 A | 10/2012 |
| JP | 2013502811 A | 1/2013 |
| WO | 2014051494 A1 | 4/2014 |

OTHER PUBLICATIONS

1st Japanese Office Action for Japanese Application No. 2018-544,822, dated Jul. 25, 2019 (Jul. 25, 2019)—6 pages (English translation—5 pages).

CATT, Support of PUCCH for LAA Scell, and 3 GPP TSG-RAN WG1#84 R1, Feb. 15, 2016, St. Julian's, Malta, 2 pages.

Extended European Search Report for European Application No. 17755831.9, dated Aug. 20, 2019 (Aug. 20, 2019)—8 pages.

Nokia Networks, Alcatel-Lucent, Alcatel-Lucent Shanghai Bell, Channel Access for the Support of LAA UL, 3GPP TSG RAN WG1 Meeting #84, St. Julian's, Malta, Feb. 15, 2016, 7 pages.

Qualcomm Incorporated, PUCCH Design Details, 3GPP TSG RAN WG1 #84, Feb. 15, 2016, St. Julian's Malta, 3 pages.

Qualcomm Incorporated, SRS Design Details, 3GPP TSG RAN WG1 #84, Feb. 15, 2016, St. Julian's Malta, 3 pages.

* cited by examiner

METHOD AND DEVICE FOR TRANSMITTING SOUNDING REFERENCE SIGNAL, CHIP AND USER EQUIPMENT

CROSS-REFERENCE TO RELATED APPLICATION

The present application is the U.S. national phase of PCT Application No. PCT/CN2017/074671 filed on Feb. 24, 2017, which claims a priority of the Chinese patent application No. 201610109196.7 filed on Feb. 26, 2016, which is incorporated herein by reference in its entirety.

TECHNICAL FIELD

The present disclosure relates to the field of communication technology, in particular to a method and a device for transmitting a Sounding Reference Signal (SRS), a chip and a User Equipment (UE).

BACKGROUND

There have experienced a first-generation (1G) mobile communication technology, a second-generation (2G) mobile communication technology, a third-generation (3G) mobile communication technology and a fourth-generation (4G) mobile communication technology so far. For the 1G mobile communication technology, i.e., an initial cellular phone standard where analog and voice communication is allowed, an analog technique and a Frequency Division Multiple Access (FDMA) technique are mainly adopted. For the 2G mobile communication technology, a digital technique has been introduced, so as to increase a network capacity, and improve the voice communication quality and security, represented by Global System for Mobile Communication (GSM) and Code Division Multiple Access Interim Standard 95 (CDMA IS-95). For the 3D mobile communication technology, CDMA techniques, e.g., CDMA2000, Wireless CDMA (WCDMA) and Time Division Synchronous CDMA (TD-SCDMA), are adopted. For the fourth mobile communication technology, a Long Term Evolution/Long Term Evolution-Advanced (LTE/LTE-A) technique has been proposed by the $3^{rd}$-Generation Partnership Projection (3GPP), where downlink transmission is performed on the basis of an Orthogonal Frequency Division Multiple Access (OFDMA) technique while uplink transmission is performed on the basis of a Single Carrier-Frequency Division Multiple Access (SC-FDMA) technique. Depending on a flexible bandwidth and a self-adaptive modulation and encoding mode, it is able for the 4G mobile communication technology to perform high-speed transmission at a downlink peak rate of 1 Gbps and an uplink peak rate of 500 Mbps.

A MulteFire (MF) network, as a new LTE-based network, is capable of being operated independently within an unlicensed spectrum without any necessity to provide an "anchor point" within a licensed spectrum. In the MF network, a new uplink transmission method, i.e., stand-alone LTE-U, is defined on the basis of a Licensed-Assisted Access (LAA) downlink transmission mode in LTE Release 13 (LTE R13). During the uplink transmission, a Block-Interleaved Frequency Division Multiple Access (B-IF-DMA) technique, different from the SC-FDMA technique adopted by a conventional LTE network, is adopted by the MF network so as to meet the requirement of a regional specification on the occupation of bandwidth within the unlicensed spectrum. In addition, an MF Extended Physical Uplink Control Channel (MF-ePUCCH) and an MF Short Physical Uplink Control Channel (MF-sPUCCH) have been introduced into a physical uplink channel of the MF network, so as to transmit Uplink Control Information (UCI) which, however, is transmitted in the conventional LTE network through a Physical Uplink Control Channel (PUCCH), e.g., Acknowledgement/Non-acknowledgement (ACK/NACK), Channel Station Information (CSI) and Scheduling Request (SR).

Physical uplink channel information such as an SRS and a Physical Random Access Channel (PRACH) may also be transmitted by the MF network in a same physical channel format as the PUCCH.

For the MF-ePUCCH, it occupies a subframe consisting of 14 B-IFDMA symbols in a time domain, while for the MF-sPUCCH, it merely occupies 1 to 4 B-IFDMA symbols in the time domain.

During the transmission, the MF-sPUCCH may be transmitted separately and periodically, so as to, for example, mainly transmit a Random Access Channel (RACH) for random access. In addition, the MF-sPUCCH may also be transmitted within a subframe where the downlink transmission is switched to the uplink transmission in a Transmission Opportunity (TXOP), i.e., an MF-SPUCCH region may be transmitted at the beginning of the uplink transmission, The MF-sPUCCH region may also be called as any other equivalent terms, e.g., uplink subframe, uplink Transmission Time Interval (TTI), or Uplink Pilot Time Slot (UpPTS). For convenience of description, the MF-sPUCCH region is adopted hereinafter.

There is no gap between the MF-sPUCCH in the TROP and a Physical Uplink Shared Channel (PUSCH) and/or the MF-ePUCCH immediately subsequent to the MF-sPUCCH. In other words, when the MF-sPUCCH and the subsequent PUSCH/MF-ePUCCH are scheduled by a UE for the transmission of an uplink signal, a Listen Before Talk (LBT) mechanism may be adopted by the UE before the MF-sPUCCH. When the PUSCH/MF-ePUCCH subsequent to the MF-sPUCCH, rather than the MF-sPUCCH, is scheduled by the UE for the transmission of the uplink signal, the LBT mechanism needs to be adopted by the UE before the MF-sPUCCH region, and a specific signal (e.g., the SRS or any other signal) needs to be transmitted over the MF-sPUCCH region so as to ensure that the channel is occupied continuously within a time period after the LBT mechanism has been adopted successfully and before the PUSCH/MF-ePUCCH has been scheduled. The SRS is configured to estimate frequency-domain information about the uplink channel for the selective scheduling of a frequency, and to estimate the uplink channel for a downlink beam forming operation.

When the PUSCH/MF-ePUCCH is merely scheduled by the UE for the transmission of the uplink signal, a resource for the transmission of the uplink signal in the MF-sPUCCH region may not be scheduled by an evolved. Node B (eNB), and instead it may be selected by the UE itself. Hence, the same resource in the MF-sPUCCH region may probably be selected by different UEs, and at this time, resource collision may occur for the UEs. As the worst consequence, the information such as the UCI may not be received correctly due to the collision with the scheduled MF-sPUCCH.

Although the collision of the scheduled MF-sPUCCH with a non-scheduled signal is capable of being prevented through dividing the resources in the MF-sPUCCH region into groups, it is found that, it is still impossible to prevent the collision in a non-scheduled MF-sPUCCH region. At this time, the signals transmitted in the non-scheduled MFsPUCCH region may be untrusted. For example, during the transmission of the SRS, a channel estimation error may occur for the eNB due to the collision, and thereby the subsequent uplink scheduling performance may be adversely affected. When these signals are omitted, the transmission power and the spectrum resources for these signals may be wasted.

In addition, when the SRS is transmitted in a same B-IFDMA mode as the MF-sPUCCH, due to a frequency-domain resource allocation characteristic in the B-IFDMA mode, the SRSs transmitted via the MF-sPUCCH and Demodulation Reference signals (DMRSs, which are used for uplink control and the relevant demodulation of a data channel) transmitted via the immediately subsequent PUSCH/MF-ePUCCH are distributed evenly in the frequency domain within the entire system bandwidth. However, the contribution of the SRS to the estimation of the channel quality in the entire system bandwidth is far less than the contribution of the SC-OFDMA-based frequency-domain resource allocation mode for the conventional LTE system. Hence, there is an urgent need to improve the estimation accuracy of the channel quality within the system bandwidth through the SRS.

SUMMARY

An object of the present disclosure is to provide a method and a device for transmitting an SRS, and a UE, so as to prevent the occurrence of the resource collision in the non-scheduled MF-sPUCCH region.

In one aspect, the present disclosure provides in some embodiments a method for transmitting an SRS, including: acquiring scheduling information of an uplink transmission channel when the uplink transmission channel is being scheduled; determining a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and transmitting the SRS via the resource adopted by the uplink control channel.

In another aspect, the present disclosure provides in some embodiments a device for transmitting an SRS, including: an acquisition module configured to acquire scheduling information of an uplink transmission channel when the uplink transmission channel is being scheduled; a processing module configured to determine a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and a transmission module configured to transmit the SRS via the resource adopted by the uplink control channel.

In yet another aspect, the present disclosure in some embodiments a UE, including: a receiver configured to receive scheduling information of an uplink transmission channel when the uplink transmission channel is being scheduled; a processor connected to the receiver and configured to determine a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and a transmitter connected to the processor and configured to transmit the SRS via the resource adopted by the uplink control channel.

According to the method and the device for transmitting the SRS and the UE in the embodiments of the present disclosure, a position of a resource adopted by a non-scheduled uplink control channel is determined in accordance with the predetermined mapping relationship between the scheduling information of the uplink transmission channel and the resources adopted by the uplink control channel, so as to reduce or even prevent the occurrence of the collision of the uplink control resource among different UEs.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

For a MF network in a related art, a PUSCH/MF-ePUCCH is merely scheduled by the UE for the transmission of an uplink control signal, and the uplink control signal is transmitted through a resource in an MF-sPUCCH region selected by the UE by itself, so the same resource in the MF-sPUCCH region may probably be selected by different UEs, and at this time, resource collision may occur for the UEs. An object of the present disclosure is to provide a method and a device for transmitting an SRS, and a UE, so as to determine a position of a resource for a non-scheduled uplink control channel in accordance with a predetermined mapping relationship between scheduling information of an uplink transmission channel and resources adopted by the uplink control channel, thereby to reduce and even prevent the occurrence of collision of the uplink control resources among the UEs.

Figure 1:
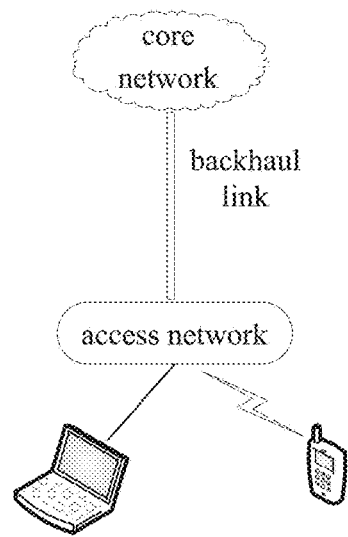
FIG. 1 is a schematic view showing basic architecture of a mobile communication network.

FIG. 1 is a schematic view showing basic architecture of a mobile communication system. The mobile communication system is established by an operator so as to provide a communication service for a UE (e.g., a mobile terminal such as mobile phone) through the deployment of a wireless access network device (e.g., a base station) and a core network device (e.g., a Home Location Register (HLR)).

Figure 2:
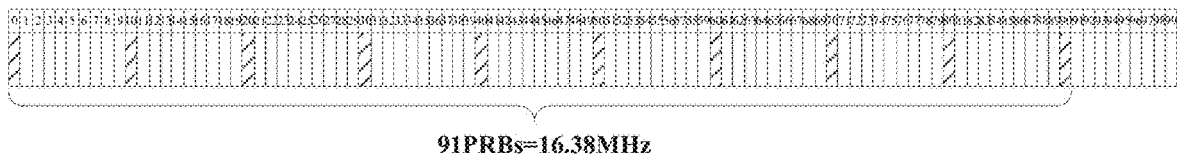
FIG. 2 is a schematic view showing the allocation of frequency-domain resources for an uplink channel.

FIG. 2 shows a frequency-domain resource allocation mode B-IFDMA for an uplink channel (including a PUCCH and/or a PUSCH). At a bandwidth of 20 MHz, there are 10 interlace units, and each interlace unit has a size of 10 Physical Resource Blocks (PRBs) spaced apart from each other at an equal interval in a frequency domain, an interlace unit #0 includes 10 PRBs indicated by slashes in FIG. 2.

Figure 3:
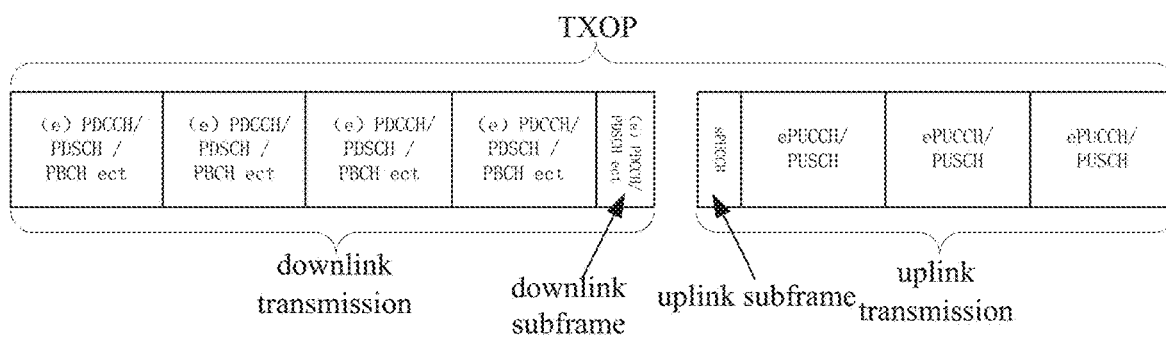
FIG. 3 is a schematic view showing a TXOP.

As shown in FIG. 3, an MF-sPUCCH may be transmitted within a subframe in a TXOP where downlink transmission is switched to uplink transmission, i.e., at the beginning of the uplink transmission in an MF-sPUCCH region.

Figure 4:
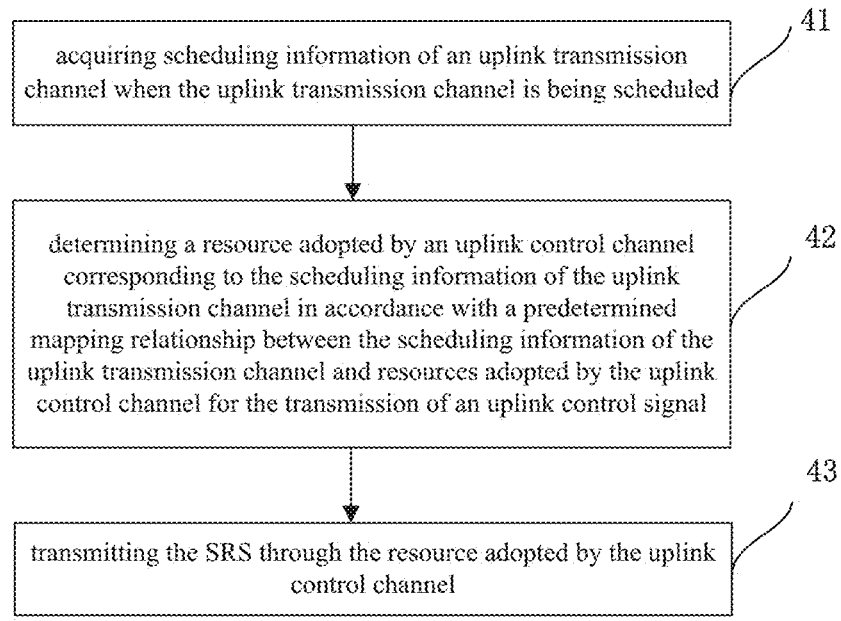
FIG. 4 is a flow chart of a method for transmitting an SRS according to one embodiment of the present disclosure.

The present disclosure provides in some embodiments a method for transmitting an SRS which, as shown in FIG. 4, includes the following steps.

Step 41: acquiring scheduling information of an uplink transmission channel when the uplink transmission channel is being scheduled.

The uplink transmission channel may be an uplink transmission channel for the transmission of an uplink data signal, e.g., a PUSCH, or an uplink transmission channel for the transmission of a control signal, e.g., an MF-ePUCCH or an MF-sPUCCH. When the uplink transmission channel is being scheduled, information representing a position of a resource occupied by the uplink transmission channel, e.g., a serial number of the position of the occupied resource, may be carried in the scheduling information of the uplink transmission channel. A UE may directly receive from a base station the scheduling information of the uplink transmission channel for the transmission of the uplink data signal, or it may acquire the scheduling information through parsing channel information about the scheduled uplink transmission channel.

Step 42: determining a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal.

Here, the predetermining mapping relationship between the scheduling information of the uplink transmission channel and the resources adopted by the uplink control channel for the transmission of the uplink control signal refers to a mapping relationship between an identifier of the resource adopted by the uplink transmission channel and an identifier of the resource adopted by the uplink control channel. To be specific, the predetermined mapping relationship may include a predetermined mapping relation between the scheduling information of the uplink transmission channel and all the resources adopted by the uplink control channel for the transmission of the uplink control channel, or a predetermined mapping relationship between the scheduling information of the uplink transmission channel and non-scheduled resources adopted by the uplink control channel for the transmission of the uplink control signal. Upon the determination of the identifier of the resource adopted by the uplink transmission channel, it is able to determine the identifier of the resource adopted by the corresponding uplink control channel in accordance with the predetermined mapping relationship, thereby to determine the position of the resource adopted by the uplink control channel.

Step 43: transmitting the SRS through the resource adopted by the uplink control channel.

To be specific, the SRS may be mapped to the resource adopted by the uplink control channel determined in Step 42 and then transmitted, or the resource adopted by the uplink control channel determined in Step 42 may serve as the resource for the transmission of the SRS.

According to the embodiments of the present disclosure, the UE may determine the position of the resource adopted by the corresponding uplink control channel in accordance with the predetermined mapping relationship between the scheduling information of the uplink transmission channel and the resources adopted by the uplink control channel as well as the acquired scheduling information of the scheduled uplink transmission channel, so as to reduce or even prevent the occurrence of collision of uplink control resources among different UEs.

Figure 5:
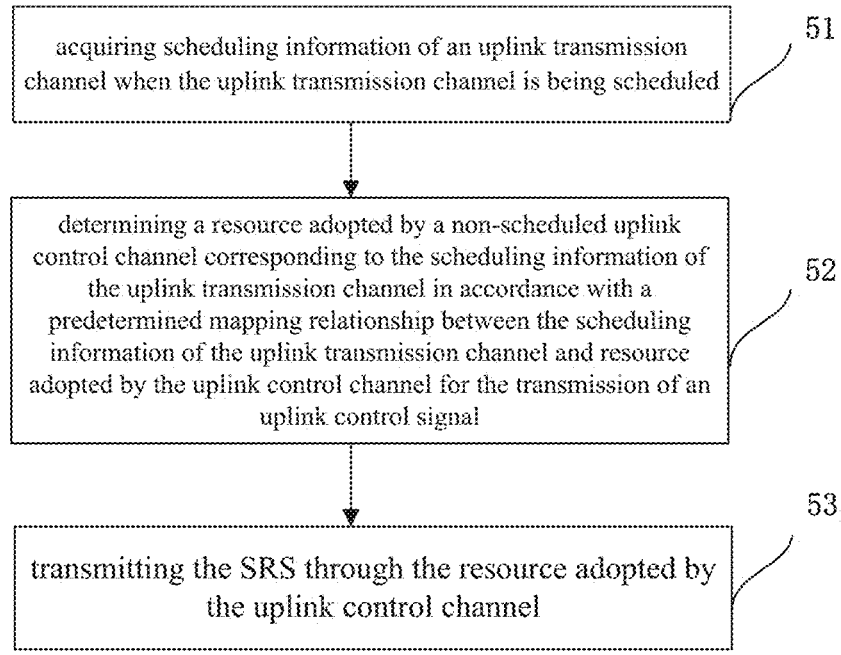
FIG. 5 is another flow chart of the method for transmitting the SRS according to one embodiment of the present disclosure.

The present disclosure further provides in some embodiments a method for transmitting an SRS which, as shown in FIG. 5, includes: Step 51 of acquiring scheduling information of an uplink transmission channel when the uplink transmission channel is being scheduled; Step 52 of determining a resource adopted by a non-scheduled uplink control channel corresponding to the scheduling information of the uplink transmission channel in accordance with a predetermined mapping relationship between the scheduling information of the uplink transmission channel and resource adopted by the uplink control channel for the transmission of an uplink control signal; and Step 53 of transmitting the SRS through the resource adopted by the uplink control channel.

It should be appreciated that, the method in the embodiments of the present disclosure may be implemented after performing an LBT mechanism.

During the uplink transmission, usually an MF-sPUCCH region for the transmission of uplink control information or special information (e.g., the SRS) and an immediately subsequent uplink subframe (PUSCH/MF-ePUCCH) may be involved. In a scenario where the UE is merely scheduled to transmit the uplink control signal within an uplink subframe subsequent to the MF-sPUCCH region, the UE may, in accordance with the scheduling information, select a transmission resource position for the SRS in the MF-sPUCCH region (or an uplink subframe) and select a transmission resource position within an uplink subframe for the PUSCH/MF-ePUCCH. To be specific, for a serving cell c as an MF cell, the UE may be configured to trigger the transmission of the SRS of a type 2 on the serving cell c. When there is the MF-sPUCCH within a subframe n-1 of the serving cell c, no uplink control information (UCI) is transmitted within a subframe where the PM-sPUCCH is located and Downlink Control Information (DCI) formats 0A/0B/4A/4B for scheduling the PUSCH or the MF-ePUCCH from Symbol #0 within a subframe n of the serving c are received within a subframe not later than a subframe n-4, the SRS may be transmitted through the resource for the MF-sPUCCH within the subframe n-1.

In the embodiments of the present disclosure, the predetermined mapping relationship between the scheduling information of the uplink transmission channel and the resources adopted by the uplink control channel for the transmission of the uplink control signal refers to a mapping relationship between an identifier of a resource adopted by the uplink transmission channel and a identifier of a resource which is adopted by a non-scheduled uplink control channel and which has not been allocated yet (i.e., a resource which has been allocated for the non-scheduled uplink control channel). Upon the determination of the identifier of the resource adopted by the uplink transmission channel, it is able to determine the identifier of the unallocated resource adopted by the non-scheduled uplink control channel in accordance with the predetermined mapping relationship, thereby to determine the position of the resource.

Further, uplink transmission channel is a PUSCH/MF-ePUCCH, and the uplink control channel is an MF-sPUCCH.

To be specific, Step 52 includes: acquiring division information about scheduled resources and non-scheduled resources configured by a base station through RRC signaling or indicated by the base station through a Common Physical Downlink Control Channel (CPDCCH); and determining the resource adopted by the non-scheduled uplink control channel corresponding to the scheduling information of the uplink transmission channel in accordance with the division information, the scheduling information and the predetermined mapping relationship between the scheduling information of the uplink transmission channel and the resources adopted by the uplink control channel for the transmission of the uplink control signal.

Here, the base station may notify the UE of the division information about the currently-scheduled resources and the non-scheduled resources, so that the UE, may determine the corresponding resource position in accordance with the division information and the scheduling information.

The resources adopted by the uplink control channel are divided into groups; the groups include resources for the scheduled uplink control channel (i.e. the scheduled MF-sPUCCH) and resources for the non-scheduled uplink control channel (i.e., the non-scheduled MF-sPUCCH). A transmission format of the SRS may adopt a same sequence as a Demodulation Reference Signal (DMRS) sequence, and a multiplexing mode (or a bearing mode) of the DMRS is related to a data transmission format, so the resource groups may be divided in accordance with the data transmission format. The dividing the resources for the scheduled uplink control channel (i.e., the scheduled MF-sPUCCH) and the resources for the non-scheduled uplink control channel (i.e., the non-scheduled MF-sPUCCH) may include merely notifying a range of serial numbers of the resources for the scheduled uplink control channel (i.e., the scheduled MF-sPUCCH), merely notifying a range of serial numbers of the resources for the non-scheduled uplink control channel (i.e., the non-scheduled MF-sPUCCH), or both. Further, the resources for the scheduled uplink control channel (i.e., the scheduled MF-sPUCCH) and the resources for the non-scheduled uplink control channel (i.e., the non-scheduled MF-sPUCCH) may be notified through RRC signaling or indicated through the CPDCCH.

When different transmission formats are adopted by the SRS in the MF-sPUCCH region, the non-scheduled resources in the MF-sPUCCH region (for the transmission of the SRS) and the scheduled resources in the MF-sPUCCH region may be differentiated from each other through different SRS time-domain resource allocation modes.

1. When the SRS is transmitted in a transmission format known in a conventional LTE system, i.e., an IFDMA mode where an interval between subcarriers is 2, i.e., merely odd-numbered or even-numbered subcarriers in a plurality of consecutive PRBs are occupied, due to the difference between a B-IFDMA mode and the IFDMA mode, it is necessary to allocate consecutive PRBs for the SRS apart from the PRBs occupied by the scheduled MF-sPUCCH. In addition, the SRS may occupy a plurality of consecutive symbols in a time domain, e.g., it may occupy all the symbols in the MF-sPUCCH region in the time domain.

2. When the SRS adopts a same B-IFDMA mapping mode as the MF-sPUCCH/PUSCH/MF-ePUCCH in MuLTEfire, i.e., adopts all the subcarriers in a plurality of PRBs at an equal interval in the frequency domain, due to the B-IFDMA mapping mode having same parameters, a same interlace unit or different interlace units may be allocated for the SRS and the MF-sPUCCH. The SRS and the MF-sPUCCH may be orthogonal to each other in the same PRB or interlace unit through different cyclic shifts and/or Orthogonal Cover Codes (OCCs) of a same sequence. The SRS may occupy a plurality of consecutive symbols in the time domain, e.g., occupy all the symbols in the MF-sPUCCH region in the time domain.

3. When the SRS adopts a mapping mode where merely the odd-numbered or even-numbered subcarriers in the B-IFDMA interlace unit, i.e., the odd-numbered or even-numbered subcarriers in a plurality of PRBs at an equal interval in the frequency domain, are occupied, due to the difference between the B-IFDMA mode and the IFDMA mode for the interlace unit, different interlace units may be allocated for the SRS and the MF-sPUCCH. The SRS may occupy a plurality of consecutive symbols in the rime domain, e.g., occupy all the symbols in the MF-sPUCCH region in the time domain.

Depending on the different transmission formats of the SRS, the resources for the scheduled MF-sPUCCH may be differentiated from the resources for the non-scheduled MF-sPUCCH, so as to facilitate the determination of the resource adopted by the non-scheduled MF-sPUCCH corresponding to the scheduling information of the uplink transmission channel from the resources for the non-scheduled MF-sPUCCH, thereby to reduce or even prevent the occurrence of the resource collision for different UEs.

The scheduling information may include at least one of a serial number of a control channel element (CU) or an enhanced control channel element (ECCE), a serial number of a frequency-domain resource occupied by the uplink transmission channel when the uplink transmission channel is being scheduled, a serial number of a sequence and a serial number of a cyclic shift occupied by the uplink transmission channel when the uplink transmission channel is being scheduled, and a serial number of an OCC sequence occupied by the uplink transmission channel when the uplink transmission channel is being scheduled, these serial numbers are carried in uplink (UL) grant information of the uplink transmission channel.

For example, when the UL grant information is transmitted through the PDCCH, the serial number of the CCE or ECCE carried in the UL grant information about the uplink transmission channel, i.e., the UL grant information about the scheduled PUSCH/MF-ePUCCH, may be a serial number of an Nth CCE, for example an $1^{st}$ CCE, carried in the UL grant information. The CCE is a time frequency resource element for the transmission of a control channel in the LTE system, and the ECCE is another time-frequency resource element for the transmission of the control channel.

The serial number of the frequency-domain resource occupied by the uplink transmission channel when the uplink transmission channel is being scheduled may include serial numbers of N interlace units or PRBs occupied by the scheduled PUSCH/MF-ePUCCH configured through RRC signaling or resource allocation indication information in the DCI bearing the UL grant information, e.g., a serial number of a $1^{st}$ interlace unit or PRB.

The serial number of the sequence or cyclic shift occupied by the uplink transmission channel when the uplink transmission channel is being scheduled may include a DMRS sequence occupied by the MF-ePUCCH or a serial number of the DMRS sequence, and a serial number of information about a size of the cyclic shift.

The serial number of the OCC sequence occupied by the uplink transmission channel when the uplink transmission channel is being scheduled may include a serial number of a Walsh code or a serial number of a Discrete Fourier Transformation (DFT)-based OCC.

The mapping relationship may include a mapping relationship between the scheduling information of the uplink transmission channel and the serial number of the resource adopted by the uplink control channel.

In other words, the mapping relationship between the scheduling information of the uplink transmission channel and the resources adopted by the uplink control channel for the transmission of the uplink control signal may include a mapping relationship between the serial numbers of the CCEs (or ECCEs) occupied by the UL grant information about the scheduled PUSCH/MF-ePUCCH and the serial numbers of the resources for all the MF-sPUCCHs, or a mapping relationship between the serial numbers of the interlace units or PRBs occupied by the PUSCH/MF-ePUCCH and the serial numbers of the resources for all the MF-sPUCCHs, or a mapping relationship between the serial numbers of the frequency-domain sequences occupied by the MF-ePUCCH/the serial numbers of the cyclic shifts for the frequency-domain sequences and the serial numbers of the resources for all the MF-sPUCCHs, or a mapping relationship between the serial numbers of the OCC sequences occupied by the PUSCH/MF-ePUCCH and the serial numbers of the resources for all the MF-sPUCCHs.

In a possible embodiment of the present disclosure, the mapping relationship between the scheduling information of the uplink transmission channel and the resources adopted by the uplink control channel for the transmission of the uplink control signal may include a mapping relationship between the serial numbers of the CCEs (or ECCE) occupied by the UL grant information about the scheduled PUSCH/MF-ePUCCH and the serial numbers of the resources for the non-scheduled MF-sPUCCH, or a mapping relationship between the serial numbers of the interlace units or PRBs occupied by the PUSCH/MF-ePUCCH and the serial numbers of the resources for the non-scheduled MF-sPUCCH, or a mapping relationship between the serial numbers of the frequency-domain sequences occupied by the MF-ePUCCH/the serial numbers of the cyclic shifts for the frequency-domain sequences and the serial numbers of the resources for the non-scheduled MF-sPUCCH, or a mapping relationship between the serial numbers of the OCC sequences occupied by the PUSCH/MF-ePUCCH and the serial numbers of the resources for the non-scheduled MF-sPUCCH.

According to the embodiments of the present disclosure, the position of the resource adopted by the non-scheduled MF-sPUCCH corresponding to the scheduling information is determined in accordance with the mapping relationship between the scheduling information of the uplink transmission channel and the serial numbers of the resources adopted by the uplink control channel as well as the scheduling information about the scheduled PUSCH/MF-ePUCCH, so as to prevent the occurrence of the resource collision when the same MF-sPUCCH resource position is adopted by a plurality of UEs simultaneously.

Figure 6:
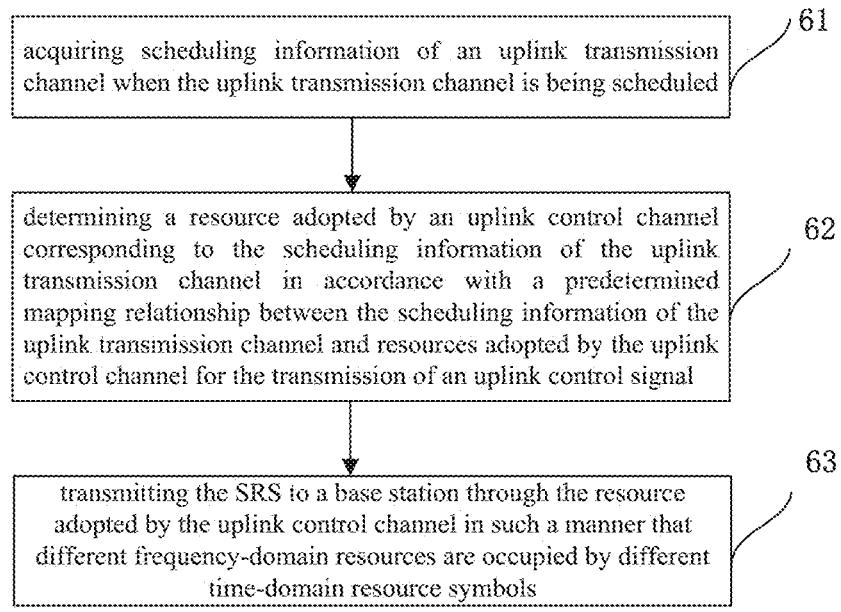
FIG. 6 is yet another flow chart of the method for transmitting the SRS according to one embodiment of the present disclosure.

The present disclosure further provides in some embodiments a method for transmitting an SRS which, as shown in FIG. 6, includes: Step 61 which is the same as the above-mentioned Step 41; Step 62 which is the same as the above-mentioned Step 42; and Step 63 of transmitting the SRS to a base station through the resource adopted by the uplink control channel in such a manner that different frequency-domain resources are occupied by different time-domain resource symbols.

Here, the SRS may be mapped to a position of the resource adopted by the uplink control channel determined in Step 62, and a position of the resource adopted by the MF-sPUCCH/SRS determined in Step 62, so as to transmit the SRS.

The plurality of time-domain symbols occupied by the MF-sPUCCH/SRS are located at different frequency-domain resource positions, i.e., a frequency-domain resource position on a first time-domain symbol occupied by the MF-sPUCCH/SRS is different from a frequency-domain resource position on a second time-domain symbol occupied by the MF-sPUCCH/SRS. In terms of the plurality of time-domain symbols, the frequency-domain resources are occupied by the channel for the transmission of the SRS in a denser manner. In this way, it is able to reduce an interval between the frequency-domain resources for the transmission of the SRS, thereby to improve the channel estimation accuracy to some extent.

Figure 7:
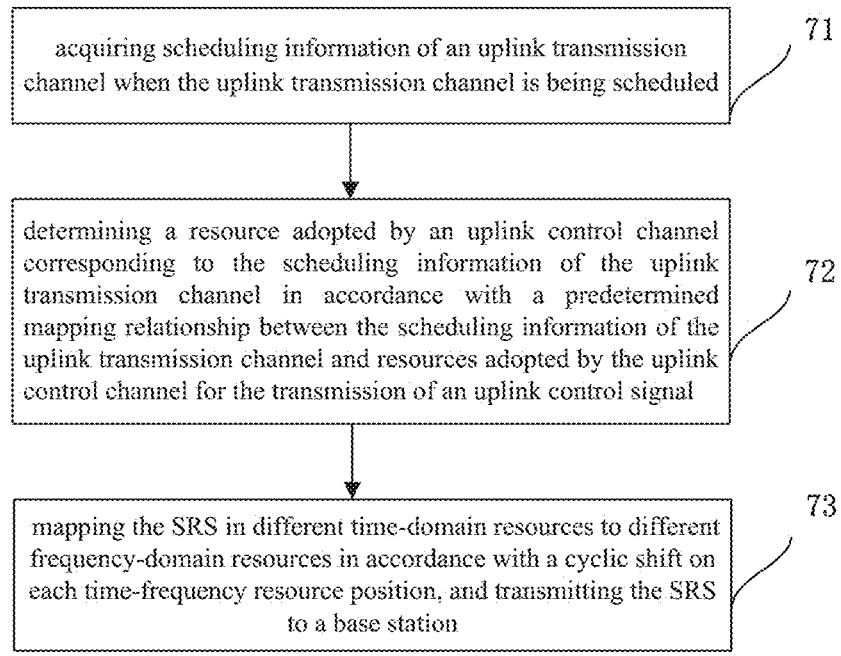
FIG. 7 is still yet another flow chart of the method for transmitting the SRS according to one embodiment of the present disclosure.

The present disclosure further provides in some embodiments a method for transmitting an SRS which, as shown in FIG. 7, includes: Step 71 which is the same as the above-mentioned Step 41; Step 72 which is the same as the above-mentioned Step 42; and Step 73 of mapping the SRS in different time-domain resources to different frequency-domain resources in accordance with a cyclic shift on each time-frequency resource position, and transmitting the SRS to a base station. A size of the cyclic shift on each frequency-domain resource is determined in accordance with the quantity of time-domain resource symbols for the resource adopted by the uplink control channel and a frequency interval between the frequency-domain resources occupied by the SRS in the same time-domain resource.

For example, a frequency-domain resource position selected for a first symbol of the MF-sPUCCH/SRS (i.e., a serial number of an interlace unit) is determined by the scheduling information about the PUSCH/MF-ePUCCH, a frequency-domain resource position selected for a second symbol is acquired by cyclically shifting the frequency-domain resource position for the first symbol by T bits, . . . , until all the time-domain symbols have been transmitted. T may be determined in accordance with the total quantity of the time-domain resource symbols occupied by the MF-sPUCCH/SRS as well as the frequency interval between the frequency-domain resources occupied by the SRS in the same time-domain resource. In a possible embodiment of the present disclosure, the cyclic shift T on the frequency-domain resource may also be determined in accordance with the frequency interval between the frequency-domain resources occupied by the SRS and the PUSCH/MF-ePUCCH in the same time-domain resource. In this way, It is able to reduce the frequency interval between the frequency-domain resources for the transmission of the SRS, thereby to improve the SRS estimation accuracy.

The transmission format of the SRS may adopt a same sequence as a DMRS sequence, and a multiplexing mode (or a bearing mode) of the DMRS is related to a data transmission format. To be specific, in the MF-sPUCCH region (including the scheduled. MF-sPUCCH and the non-scheduled MF-sPUCCH), an orthogonal multiplexing mode of B-IFDMA codes may be adopted by the MF-sPUCCH (the B-IFDMA code is essentially a special OFDMA code for the resource allocation), and 1 to 4 time-domain resource symbols may be occupied by the MF-sPUCCH. When more than 2 time-domain resource symbols are occupied, some symbols may be adopted for the transmission of the DMRS, and some symbols may be adopted for the transmission of the data. When 4 time-domain resource symbols are occupied by the MF-sPUCCH, the first two symbols may be adopted for the transmission of the DMRS, while the second two symbols may be adopted for the transmission of the data. At this time, a multiplexing mode of the MF-sPUCCH may include two parts, i.e., multiplexing of DMRS symbols and multiplexing of data symbols.

With respect to the symbols for the transmission of the DMRS, different cyclic shifts for a same sequence may be transmitted on each symbol so as to achieve the frequency-domain code division multiplexing operation. For example, in an LTE system, a Zadoff-Chu sequence and/or an OCC between the symbols may be adopted for the DMRS so as to achieve the time-domain orthogonal multiplexing operation, e.g., two symbols may be multiplexed through two Walsh codes having a code length of 2 bits, i.e., 00 and 01. The multiplexing mode of the DMRS may be determined by a mapping mode of the data symbols. With respect to the symbols for the transmission of the data, the modulation symbols at different quantities may be transmitted on the data symbols for each PRB, and the data symbols may be multiplexed in different modes. The following description will be given in conjunction with specific application scenarios.

For example, different modulation symbols may be transmitted through different data symbols on each PRB, and one modulation symbol may be transmitted through one data symbol. At this time, the modulation symbol may be multiplied by a sequence, which has a code length of 12 bits and which has been cyclically shifted, e.g., a Zadoff-Chu sequence, and then mapped to 12 Resource Elements (REs), and the frequency-domain orthogonal multiplexing operation may be performed on the data symbols for different UEs through different cyclic shifts. Similar to a multiplexing mode of the data symbols, the frequency-domain orthogonal multiplexing operation may also be performed on the DMRS symbols using the sequence which has been cyclically shifted. Taking two data symbols as an example, two modulation symbols may be transmitted through two data symbols on one PRB. 20 modulation symbols may be transmitted through an interlace unit (10 PRBs) of 20 MHz, and 40 encoded bits may be transmitted in a Quadrature Phase Shift Keying (QPSK) mode. When a cyclic shift interval of the sequence is 1 bit, one interlace unit is capable of at most supporting the transmission of the MF-sPUCCHs for 12 UEs simultaneously.

For another example, a same modulation symbol may be transmitted through different data symbols on each PRB and extended to a plurality of data symbols through the OCC, and one modulation symbol may be transmitted through one data symbol. At this time, the modulation symbol may be multiplied by a sequence, which has a code length of 12 bits and which has been cyclically shifted, e.g., a Zadoff-Chu sequence, and then mapped to 12 REs. With respect to the data symbols for different UEs, the frequency-domain orthogonal multiplexing operation may be performed through different cyclic shifts and the time-domain orthogonal multiplexing operation may be performed through different OCCs. Taking two data symbols as an example, one modulation symbol may be transmitted through two data symbols on one PRB. 10 modulation symbols may be transmitted through an interlace unit (10 PRBs) of 20 MHz, and 20 encoded bits may be transmitted in the QPSK mode. When a cyclic shift interval of the sequence is 1 bit, one interlace unit is capable of at most supporting the transmission of the MF-sPUCCHs for 24 (12*2) UEs simultaneously.

For yet another example, a same modulation symbol may be transmitted through different data symbols on each PRB and extended to a plurality of data symbols through the OCC, and 12 modulation symbols may be transmitted through one data symbol. At this time, 12 modulation symbols may be mapped to 12 REs. The time-domain orthogonal multiplexing operation may be performed on the data symbols for different UEs through different OCCs. Taking two data symbols as an example, 12 modulation symbols may be transmitted through two data symbols on one PRB. 120 modulation symbols may be transmitted through an interlace unit (10 PRBs) of 20 MHz, and 240 encoded bits may be transmitted in the QPSK mode. When a cyclic shift interval of the sequence is 1 bit, one interlace unit is capable of at most supporting the transmission of the MF-sPUCCHs for 2 UEs simultaneously.

The transmission format of the SRS may adopt a same sequence as the DRMS sequence, e.g., the Zadoff-Chu sequence, the SRS may also be mapped in various modes in the frequency domain.

Mode 1: an SRS transmission format in a conventional LTE network, i.e., an IFDMA mode where a subcarrier interval is 2, may be adopted. In other words, odd-numbered or even-numbered subcarriers in a plurality of consecutive PRBs may merely be occupied in the frequency domain.

Mode 2: a same B-IFDMA mapping mode as that of the MF-sPUCCH/PUSCH/MF-ePUCCH in an MF network may be adopted, i.e., all the subcarriers in a plurality of PRBs at an equal interval in the frequency domain may be occupied.

Mode 3: a mapping mode where the odd-numbered or even-numbered subcarriers are merely occupied in the B-IFDMA interlace units, i.e., the odd-numbered or even-numbered subcarriers in a plurality of PRBs at an equal interval in the frequency domain may be occupied.

The frequency-domain resources occupied by the SRS when it is mapped to the MF-sPUCCH and the transmission of the SRS will be described hereinafter in more details in conjunction with the drawings and the specific scenarios.

Scenario 1

This scenario corresponds to one of the above-mentioned mapping modes 2 and 3. When N time-domain resource symbols are occupied by the resource adopted by the uplink control channel and M interlace units are occupied on one time-domain resource symbol, the different time-domain resource symbols in the N time-domain resource symbols of the SRS may be indicated to occupy M different interlace units respectively. Then, the SRS may be mapped to the resource adopted by the uplink control channel and transmitted to the base station.

At all the frequency-domain resource positions occupied by the N time-domain resource symbols, the frequency interval between PRBs of the interlace units which are not adjacent and not consecutive in a frequency domain is determined in accordance with the cyclic shift at each frequency-domain resource position, where M and N are each a positive integer.

Figure 8:
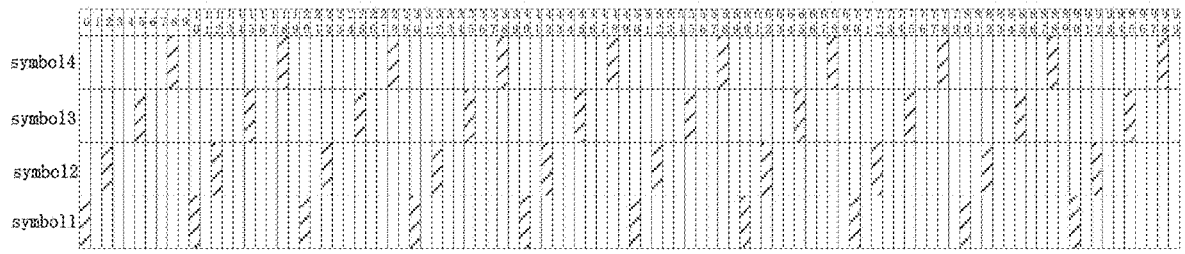
FIG. 8 is a schematic view showing a resource mapping situation for the SRS in a first scenario according to one embodiment of the present disclosure.

When 4 time-domain resource symbols are occupied by the MF-sPUCCH region, a B-IFDMA mapping mode may be adopted by the SRS, and 1 interlace unit and 4 time-domain resource symbols may be occupied by the SRS. In addition, the frequency-domain orthogonal multiplexing operation may be performed on the MF-sPUCCH and the SRS on each time-domain resource symbol using different cyclic shifts for a same sequence, and no time-domain OCC orthogonal multiplexing operation may be performed on the symbols for the MF-sPUCCH or SRS, so each symbol for the SRS may be mapped to different interlace units. As shown in FIG. 8, a 20 MHz system bandwidth includes 10 interlace units. With respect to the SRS (indicated by the slashes) for one UE, a first interlace unit (i.e., #0) is occupied by a first B-IFDMA symbol, a third interlace unit (i.e., #2) is occupied by a second B-IFDMA symbol, and a sixth interlace unit (i.e., #5) is occupied by a third B-IFDMA symbol, and a ninth interlace unit (i.e., #8) is occupied by a fourth B-IFDMA symbol. In this way, it is able to provide the SRS with the frequency intervals between the frequency-domain resources as small and even as possible. The base station may perform time-frequency-domain joint interpolation on the SRS on the 4 B-IFDMA symbols, so as to reduce a minimum frequency interval from 10 PRBs to 3 PRBs, thereby to significantly increase the estimation accuracy.

Scenario 2

This scenario corresponds to the other one of the above-mentioned mapping modes 2 and 3. When N time-domain resource symbols are occupied by the resource adopted by the uplink control channel and M interlace units are occupied on one time-domain resource symbol, every adjacent time-domain resource symbols of the SRS may be divided into one group, the time-domain resource symbols in each group may be indicated to occupy a same interlace unit, and a time-domain orthogonal code division multiplexing operation may be performed. Then, the SRS may be mapped to the resource adopted by the uplink control channel and transmitted to the base station.

The interlace units occupied by the time-domain resource symbols in different groups have different frequencies, and at all the frequency-domain resource positions occupied by the N time-domain resource symbols, the frequency interval between physical resource blocks of the interlace units which are not adjacent and not consecutive in a frequency domain is determined in accordance with the cyclic shift at each frequency-domain resource position, where M, N and L are each a positive integer.

Figure 9:
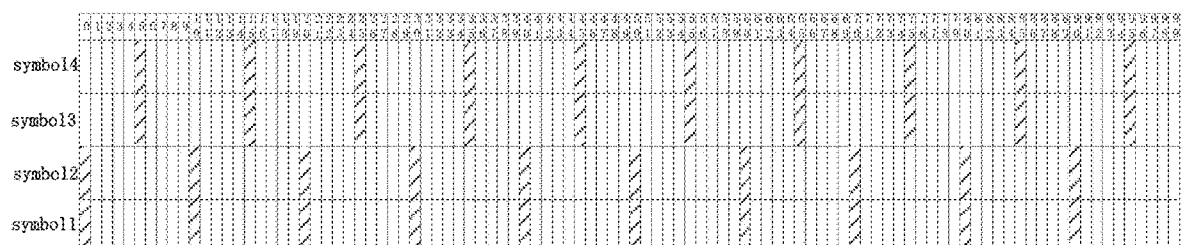
FIG. 9 is a schematic view showing a resource mapping situation for the SRS in a second scenario according to one embodiment of the present disclosure.

When 4 time-domain resource symbols are occupied by the MF-sPUCCH region, the B-IFDMA mapping mode may be adopted by the SRS, and 1 interlace unit and 4 time-domain resource symbols may be occupied by the SRS. In addition, for the MF-sPUCCH and the SRS, the frequency-domain orthogonal multiplexing operation may be performed using different cyclic shifts for a same sequence and the time-domain orthogonal multiplexing operation may be performed using different OCCs on first two symbols and second two symbols (e.g., the first two symbols are DMRS symbols while the second two symbols are data symbols) respectively, so the first two symbols and the second two symbols for the SRS may be mapped to different interlace units. As shown in FIG. 9, the 20 MHz system bandwidth includes 10 interlace units. With respect to the SRS (indicated by the slashes) for one UE, a first interlace unit (i.e., #0) is occupied by a first B-IFDMA symbol and a second B-IFDMA symbol, and a sixth interlace unit (i.e., #5) is occupied by a third B-IFDMA symbol and a fourth B-IFDMA symbol. In this way, it is able to provide the SRS with the frequency intervals between the frequency-domain resources as small and even as possible. The base station may perform time-frequency-domain joint interpolation on the SRS on the 4 B-IFDMA symbols, so as to reduce a minimum frequency interval from 10 PRBs to 5 PRBs, thereby to increase the estimation accuracy to some extent.

Scenario 3

This scenario corresponds to the above-mentioned mapping mode 1. When N time-domain resource symbols are occupied by the resource adopted by the uplink control channel, each time-domain resource symbol of the SRS may be indicated to occupy a combination of M interlace units which are consecutive in the frequency domain and which have not been allocated yet (or which have been allocated for the transmission of the SRS), and the SRS may be mapped to the resource adopted by the uplink control channel and transmitted to the base station.

At all the frequency-domain resource positions occupied by the N time-domain resource symbols, the frequency interval between physical resource blocks of the combination of the interlace units which are not adjacent and not consecutive in the frequency domain is determined in accordance with the cyclic shift at each frequency-domain resource position, where M and N are each a positive integer.

Figure 10:
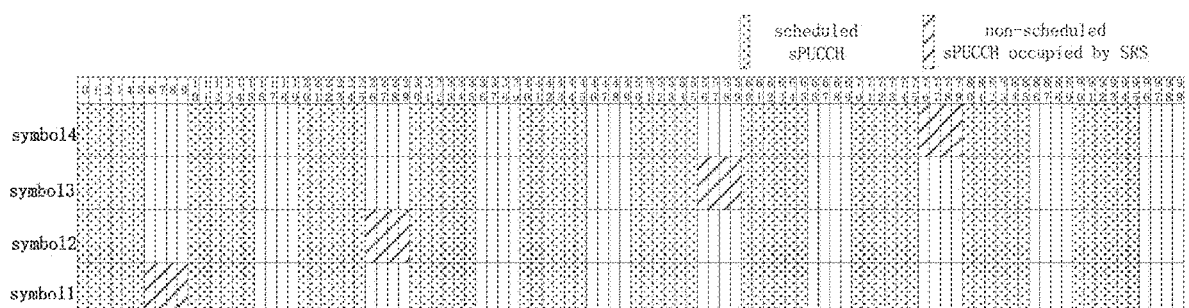
FIG. 10 is a schematic view showing a resource m mapping situation for the SRS in a third scenario according to one embodiment of the present disclosure.

When an IFDMA mode where a subcarrier interval is 2 is adopted by the SRS, a frequency hopping operation on the SRS needs to be performed at a region beyond the resources allocated for the MF-sPUCCH. As shown in FIG. 10, the 20 MHz system bandwidth includes 10 interlace units, the interlace units #0 to #5 (indicated by black dots) are allocated for the scheduled MF-sPUCCH, and the interlace units #6 to #9 are allocated for the non-scheduled SRS. When the IFDMA mode for the conventional LTE network is adopted by the SRS, the odd-numbered or even-numbered subcarriers in 4 consecutive PRBs may be occupied by the SRS for one UE (indicated by the slashes). To be specific, the odd-numbered or even-numbered subcarriers in PRBs #6 to #9 are occupied by a first IFDMA symbol, the odd-numbered or even-numbered subcarriers in PRBs #26 to #29 are occupied by a second IFDMA symbol, the odd-numbered or even-numbered subcarriers in PRBs #56 to #59 are occupied by a third IFDMA symbol, and the odd-numbered or even-numbered subcarriers in PRBs #76 to #79 are occupied by a fourth IFDMA symbol. The base station may perform time-frequency-domain joint interpolation on the SRS on the 4 symbols, so as to provide the SRS with the frequency interval as small as possible (e.g., a minimum frequency interval having 17 PRBs).

Scenario 4

This scenario corresponds to the above-mentioned mapping mode 3. When N time-domain resource symbols are occupied by the resource adopted by the uplink control channel, different time-domain resource symbols in the N time-domain resource symbols of the SRS may be indicated to occupy M interlace units which have not been allocated for the other channels yet respectively. Then, the SRS may be mapped to the resource adopted by the uplink control channel and transmitted to the base station.

At all the frequency-domain resource positions occupied by the N time-domain resource symbols, the frequency interval between physical resource blocks of the interlace units which are not adjacent and not consecutive in the frequency domain is determined in accordance with the cyclic shift at each frequency-domain resource position, where M and N are each a positive integer.

Figure 11:
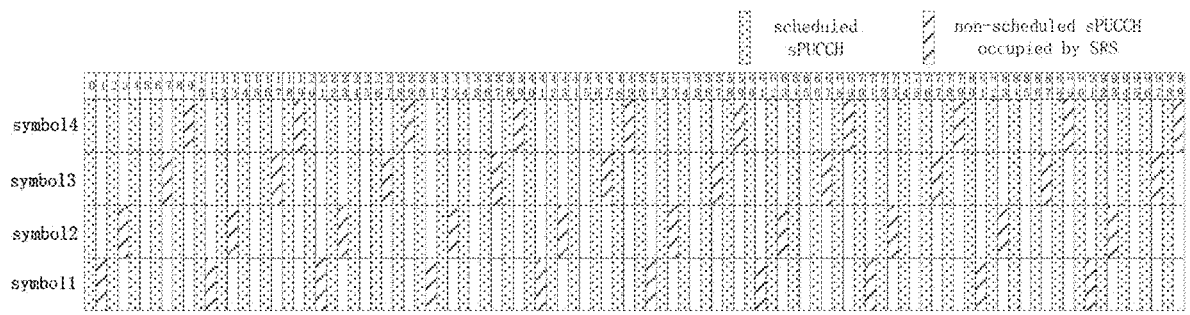
FIG. 11 is a schematic view showing a resource mapping situation for the SRS in a fourth scenario according to one embodiment of the present disclosure.

When the SRS adopts a mapping mode where merely the odd-numbered or even-numbered subcarriers in the B-IFDMA interlace unit are occupied, a frequency hopping operation on the SRS needs to be performed at a region beyond the resources allocated for the MF-sPUCCH. As shown in FIG. 11, the 20 MHz system bandwidth includes 10 interlace units, the even-numbered interlace units #0, #2, #4, #6 and #8 are allocated for the scheduled MF-sPUCCH, and the odd-numbered interlace units #1, #3, #5, #7 and #9 are allocated for the non-scheduled SRS. When the IFDMA mode where the subcarrier interval in the interlace unit is 2 bits is adopted by the SRS, the odd-numbered or even-numbered subcarriers in one interlace unit may be occupied by the SRS for one LTE. To be specific, the odd-numbered or even-numbered subcarriers in the interlace unit #1 are occupied by a first IFDMA symbol, the odd-numbered or even-numbered subcarriers in the interlace unit #3 are occupied by a second IFDMA symbol, the odd-numbered or even-numbered subcarriers in the interlace unit #7 are occupied by a third IFDMA symbol, and the odd-numbered or even-numbered subcarriers in the interlace unit #9 are occupied by a fourth IFDMA symbol. The base station may perform time-frequency-domain joint interpolation on the SRS on the 4 symbols, so as to reduce a minimum frequency interval from 10 PRBs to 3 PRBs, and provide the SRS with the frequency intervals between the frequency-domain resources as small and even as possible, thereby to increase the channel estimation accuracy to some extent.

According to the embodiments of the present disclosure, the UE determines the position of the resource adopted by the uplink control channel corresponding to the scheduling information of the uplink transmission channel in accordance with the predetermined mapping relationship between the scheduling information and the resources adopted by the uplink control channel as well as the scheduling information about the scheduled uplink transmission channel, so as to reduce or even prevent the occurrence of resource collision for different UEs. Further, upon the determination of the uplink control channel, the to-be-transmitted SRS is mapped to the uplink control channel in such a manner that different frequency-domain resources are occupied by different time-domain resource symbols, and then transmitted to the base station, so as to reduce the frequency interval between the frequency-domain resources for the transmission of the SRS, thereby to increase the channel estimation accuracy to some extent.

Figure 12:
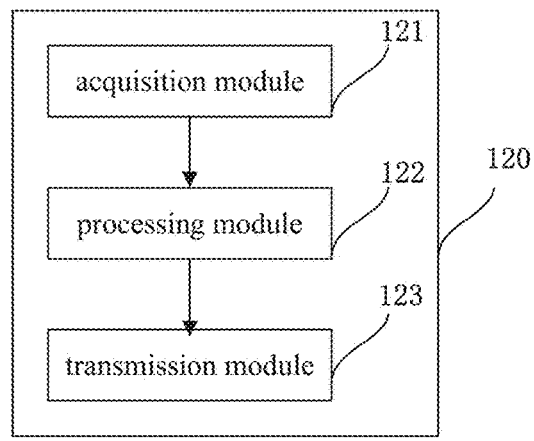
FIG. 12 is a block diagram of a device for transmitting the SRS according to one embodiment of the present disclosure.

The present disclosure further provides in some embodiments a device 120 for transmitting an SRS which, as shown in FIG. 12, includes: an acquisition module 121 configured to acquire scheduling information of an uplink transmission channel when the uplink transmission channel is being scheduled; a processing module 122 configured to determine a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and a transmission module 123 configured to determine the SRS through the resource adopted by the uplink control channel.

The acquisition module 121 includes an acquisition unit configured to acquire the scheduling information of the uplink transmission channel from a base station when the uplink transmission channel for the transmission of an uplink data signal is being scheduled.

The processing module 122 includes a processing unit configured to determine a resource adopted by a non-scheduled uplink control channel corresponding to the scheduling information of the uplink transmission channel in accordance with the predetermined mapping relationship between the scheduling information of the uplink transmission channel and the resources adopted by the link control channel for the transmission of the uplink control signal.

To be specific, the processing unit includes: an acquisition sub-unit configured to acquire division information about scheduled resources and non-scheduled resources configured by the base station through RRC signaling or indicated by the base station through a CPDCCH; and a processing sub-unit configured to determine the resource adopted by the non-scheduled uplink control channel corresponding to the scheduling information of the uplink transmission channel in accordance with the division information, the scheduling information and the predetermined mapping relationship between the scheduling information of the uplink transmission channel and the resources adopted by the uplink control channel for the transmission of the uplink control signal.

The scheduling information may include at least one of a serial number of a CCE or an ECCE, a serial number of a frequency-domain resource occupied by the uplink transmission channel when the uplink transmission channel is being scheduled, a serial number of a sequence and a serial number of a cyclic shift occupied by the uplink transmission channel when the uplink transmission channel is being scheduled, and a serial number of an OCC sequence occupied by the uplink transmission channel when the uplink transmission channel is being scheduled carried in UL grant information about the uplink transmission channel. The mapping relationship includes a mapping relationship between the scheduling information of the uplink transmission channel and the serial numbers of the resources adopted by the uplink control channel.

The transmission module 123 includes a transmission unit configured to transmit the SRS to the base station through the resource adopted by the uplink control channel in such a manner that different frequency-domain resources are occupied by different time-domain resource symbols.

To be specific, the transmission unit is further configured to map the SRS to different frequency-domain resources in different time-domain resources in accordance with a cyclic shift at a frequency-domain resource position and transmit the SRS to the base station. The cyclic shift at the frequency-domain resource position is determined in accordance with the quantity of time-domain resource symbols for the resource adopted by the uplink control channel and a frequency interval of the frequency-domain resource occupied by the SRS in a same time-domain resource.

The transmission unit includes: a first indication sub-unit configured to, when N time-domain resource symbols are occupied by the resource adopted by the uplink control channel and M interlace units are occupied on one time-domain resource symbol, indicate the different time-domain resource symbols in the N time-domain resource symbols of the SRS to occupy M different interlace units respectively, at all the frequency-domain resource positions occupied by the N time-domain resource symbols, the frequency interval between PRBs of the interlace units which are not adjacent and not consecutive in a frequency domain being determined in accordance with the cyclic shift at each frequency-domain resource position, M and N being each a positive integer; and a first transmission sub-unit configured to map the SRS to the resource adopted by the uplink control channel and transmit the SRS to the base station.

The transmission unit further includes: a second indication sub-unit configured to, when N time-domain resource symbols are occupied by the resource adopted by the uplink control channel and M interlace units are occupied on one time-domain resource symbol, divide every L adjacent time-domain resource symbols of the SRS into one group, indicate the time-domain resource symbols in each group to occupy a same interlace unit, and perform a time-domain orthogonal code division multiplexing operation, the interlace units occupied by the time-domain resource symbols in different groups having different frequencies, at all the frequency-domain resource positions occupied by the N time-domain resource symbols, the frequency interval between PRBs of the interlace units which are not adjacent and not consecutive in a frequency domain being determined in accordance with the cyclic shift at each frequency-domain resource position, M, N and L being each a positive integer; and a second transmission sub-unit configured to map the SRS to the resource adopted by the uplink control channel and transmit the SRS to the base station.

The transmission unit further includes: a third indication sub-unit configured to, when N time-domain resource symbols are occupied by the resource adopted by the uplink control channel, indicate each time-domain resource symbol of the SRS to occupy a combination of M interlace units which are consecutive in the frequency domain and which have not been allocated yet, at all the frequency-domain resource positions occupied by the N time-domain resource symbols, the frequency interval between PRBs of the combination of the interlace units which are not adjacent and not consecutive in the frequency domain being determined in accordance with the cyclic shift at each frequency-domain resource position, M and N being each a positive integer; and a third transmission sub-unit configured to map the SRS to the resource adopted by the uplink control channel and transmit the SRS to the base station.

The transmission unit further includes: a fourth indication sub-unit configured to, when N time-domain resource symbols are occupied by the resource adopted by the uplink control channel, indicate different time-domain resource symbols in the N time-domain resource symbols of the SRS to occupy M interlace units which have not been allocated for the other channels yet respectively, at all the frequency-domain resource positions occupied by the N time-domain resource symbols, the frequency interval between PRBs of the interlace units which are not adjacent and not consecutive in the frequency domain being determined in accordance with the cyclic shift at each frequency-domain resource position, M and N being each a positive integer; and a fourth transmission sub-unit configured to map the SRS to the resource adopted by the uplink control channel and transmit the SRS to the base station.

The uplink transmission channel is a PUSCH or an MF-ePUCCH, and the uplink control channel is an MF-sPUCCH.

According to the embodiments of the present disclosure, the position of the resource adopted by the non-scheduled MF-sPUCCH corresponding to the scheduling information about the scheduled PUSCH/MF-ePUCCH is determined in accordance with the predetermined mapping relationship between the scheduling information and the resources adopted by the uplink control channel as well as the scheduling information about the scheduled uplink transmission channel, so as to reduce or even prevent the occurrence of resource collision for different UEs. Further, upon the determination of the uplink control channel, the to-be-transmitted SRS is mapped to the uplink control channel in such a manner that different frequency-domain resources are occupied by different time-domain resource symbols, and then transmitted to the base station, so as to reduce the frequency interval between the frequency-domain resources for the transmission of the SRS, thereby to increase the channel estimation accuracy to some extent.

The device in the embodiments of the present disclosure corresponds to the method mentioned above, so the implementation thereof may refer to the above implementation of the method, with a same technical effect.

Figure 13:
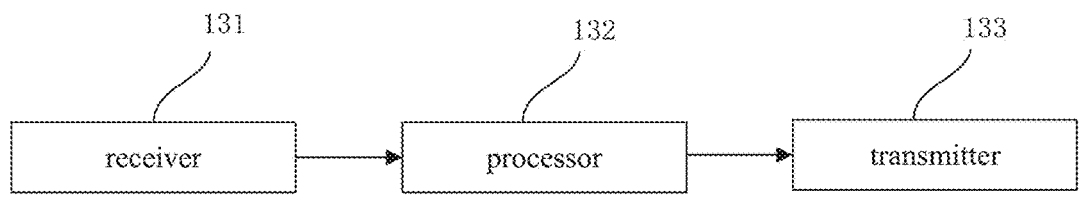
FIG. 13 is a block diagram of a UE according to one embodiment of the present disclosure.

The present disclosure further provides in some embodiments a UE which, as shown in FIG. 13, includes: a receiver 131 configured to acquire scheduling information of an uplink transmission channel when the uplink transmission channel is being scheduled; a processor 132 connected to the receiver and configured to determine a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and a transmitter 133 connected to the processor and configured to transmit the SRS through the resource adopted by the uplink control channel.

The processor 132 may be further configured to achieve the functions of all the modules of the device mentioned above, with a same technical effect.

Figure 14:
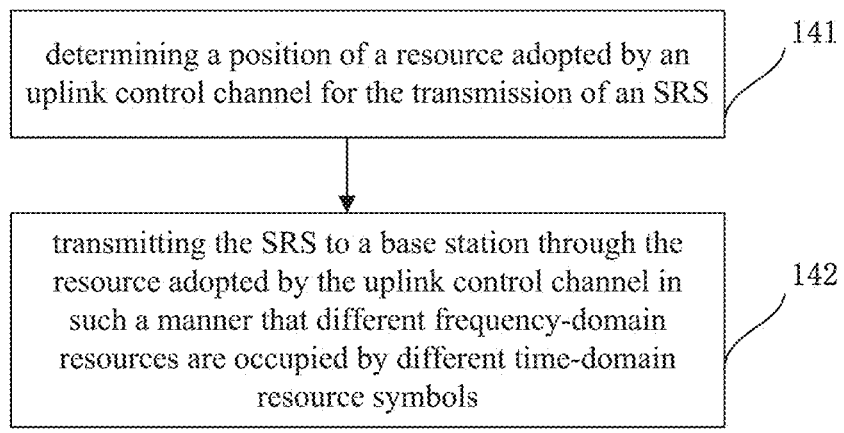
FIG. 14 is a flow chart of the method for transmitting the SRS according to one embodiment of the present disclosure.

The present disclosure further provides in some embodiments a method for transmitting an SRS which, as shown in FIG. 14, includes the following steps.

Step 141: determining a position of a resource adopted by an uplink control channel for the transmission of the SRS. The uplink control channel is configured to transmit therethrough various control signals. Here, the position of the resource adopted by the uplink control channel for the transmission of the SRS may be scheduled by a base station, or monitored by a UE itself.

Step 142: transmitting the SRS to the base station through the resource adopted by the uplink control channel in such a manner that different frequency-domain resources are occupied by different time-domain resource symbols.

The plurality of time-domain symbols occupied by the MF-sPUCCH are located at different frequency-domain resource positions, i.e., a frequency-domain resource position on a first time-domain symbol occupied by the MF-sPUCCH is different from a frequency-domain resource position on a second time-domain symbol occupied by the MF-sPUCCH. In terms of the plurality of time-domain symbols, the frequency-domain resources are occupied by the channel for the transmission of the SRS in a denser manner. In this way, it is able to reduce an interval between the frequency-domain resources for the transmission of the SRS, thereby to improve the channel estimation accuracy to some extent.

Figure 15:
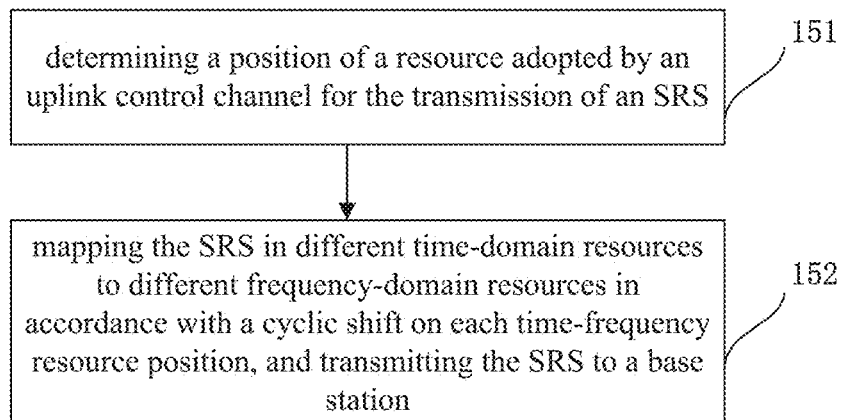
FIG. 15 is another flow chart of the method for transmitting the SRS according to one embodiment of the present disclosure.

The present disclosure further provides in some embodiments a method for transmitting an SRS which, as shown in FIG. 15, includes: Step 151 which is the same as the above Step 141: and Step 152 of mapping the SRS in different time-domain resources to different frequency-domain resources in accordance with a cyclic shift on each time-frequency resource position, and transmitting the SRS to a base station.

The cyclic shift on each frequency-domain resource is determined in accordance with the quantity of time-domain resource symbols for the resource adopted by the uplink control channel and a frequency interval the frequency-domain resources occupied by the SRS in the same time-domain resource. For example, a frequency-domain resource position selected for a first symbol of the MF-sPUCCH (i.e., a serial number of an interlace unit) is determined by the scheduling information about the PUSCH/MF-ePUCCH, a frequency-domain resource position selected for a second symbol is acquired by cyclically shifting the frequency-domain resource position for the first symbol by T bits, . . . , until all the time-domain symbols have been transmitted. T may be determined in accordance with the total quantity of the time-domain resource symbols occupied by the MF-sPUCCH as well as the frequency interval between the frequency-domain resources occupied by the SRS in the same time-domain resource. In a possible embodiment of the present disclosure, the cyclic shift T on the frequency-domain resource may also be determined in accordance with the frequency interval between the frequency-domain resources occupied by the SRS and the PUSCH/MF-ePUCCH in the same time-domain resource. In this way, It is able to reduce the frequency interval between the frequency-domain resources for the transmission of the SRS, thereby to improve the SRS estimation accuracy.

The transmission format of the SRS may adopt a same sequence as a DMRS sequence, and a multiplexing mode (or a bearing mode) of the DMRS is related to a data transmission format. The transmission format may refer to that mentioned in the above fourth embodiment. The SRS may also be mapped in various modes as the DMRS sequence in the frequency domain, e.g., the modes 1, 2 and 3 mentioned in the fourth embodiment.

The frequency-domain resources occupied by the SRS when it is mapped to the MF-sPUCCH and the transmission of the SRS will be described hereinafter in more details in conjunction with the specific scenarios.

In a first scenario where one of the above-mentioned mapping modes 2 and 3 is adopted, when N time-domain resource symbols are occupied by the resource adopted by the uplink control channel and M interlace units are occupied on one time-domain resource symbol, the different time-domain resource symbols in the N time-domain resource symbols of the SRS may be indicated to occupy M different interlace units respectively. Then, the SRS may be mapped to the resource adopted by the uplink control channel and transmitted to the base station. At all the frequency-domain resource positions occupied by the N time-domain resource symbols, the frequency interval between PRBs of the interlace units which are not adjacent and not consecutive in a frequency domain is determined in accordance with the cyclic shift at each frequency-domain resource position, where M and N are each a positive integer. More details may refer to the above-mentioned scenario 1.

In a second scenario where the other one of the mapping modes 2 and 3 is adopted, when N time-domain resource symbols are occupied by the resource adopted by the uplink control channel and M interlace units are occupied on one time-domain resource symbol, every L adjacent time-domain resource symbols of the SRS may be divided into one group, the time-domain resource symbols in each group may be indicated to occupy a same interlace unit, and a time-domain orthogonal code division multiplexing operation may be performed. Then, the SRS may be mapped to the resource adopted by the uplink control channel and transmitted to the base station. The interlace units occupied by the time-domain resource symbols in different groups have different frequencies, and at all the frequency-domain resource positions occupied by the N time-domain resource symbols, the frequency interval between physical resource blocks of the interlace units which are not adjacent and not consecutive in a frequency domain is determined in accordance with the cyclic shift at each frequency-domain resource position, where M, N and L are each a positive integer. More details may refer to the above-mentioned scenario 2.

In a third scenario where the above-mentioned mapping mode is adopted, when N time-domain resource symbols are occupied by the resource adopted by the uplink control channel, each time-domain resource symbol of the SRS may be indicated to occupy a combination of M interlace units which are consecutive in the frequency domain and which have not been allocated yet, and the SRS may be mapped to the resource adopted by the uplink control channel and transmitted to the base station. At all the frequency-domain resource positions occupied by the N time-domain resource symbols, the frequency interval between physical resource blocks of the combination of the interlace units which are not adjacent and not consecutive in the frequency domain is determined in accordance with the cyclic shift at each frequency-domain resource position, where M and N are each a positive integer. More details may refer to the above-mentioned scenario 3.

In a fourth scenario where the above-mentioned mapping mode 1 is adopted, when N time-domain resource symbols are occupied by the resource adopted by the uplink control channel, different time-domain resource symbols in the N time-domain resource symbols of the SRS may be indicated to occupy M interlace units which have not been allocated for the other channels yet respectively. Then, the SRS may be mapped to the resource adopted by the uplink control channel and transmitted to the base station. At all the frequency-domain resource positions occupied by the N time-domain resource symbols, the frequency interval between physical resource blocks of the interlace units which are not adjacent and not consecutive in the frequency domain is determined in accordance with the cyclic shift at each frequency-domain resource position, where M and N are each a positive integer. More details may refer to the above-mentioned scenario 4.

According to the embodiments of the present disclosure, upon the determination of the position of the resource adopted by the uplink control channel, the to-be-transmitted SRS is mapped to the uplink control channel in such a manner that different frequency-domain resources are occupied by different time-domain resource symbols, and then transmitted to the base station, so as to reduce the frequency interval between the frequency-domain resources for the transmission of the SRS, thereby to increase the channel estimation accuracy to some extent.

Figure 16:
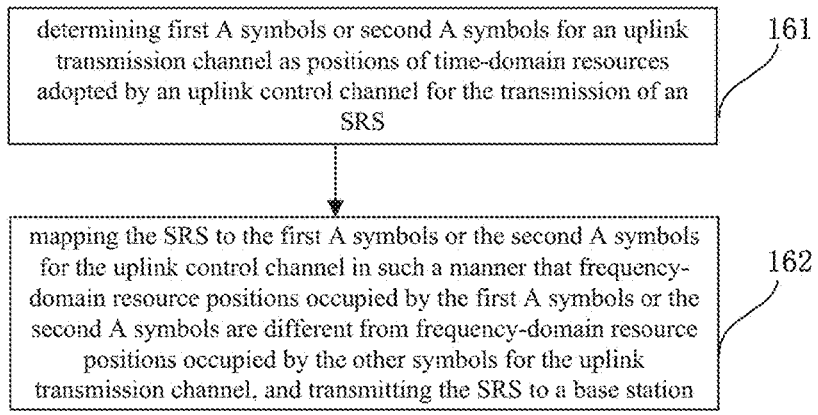
FIG. 16 is yet another flow chart of the method for transmitting the SRS according to one embodiment of the present disclosure.

The present disclosure further provides in some embodiments a method for transmitting an SRS which, as shown in FIG. 16, includes the following steps.

Figure 17:
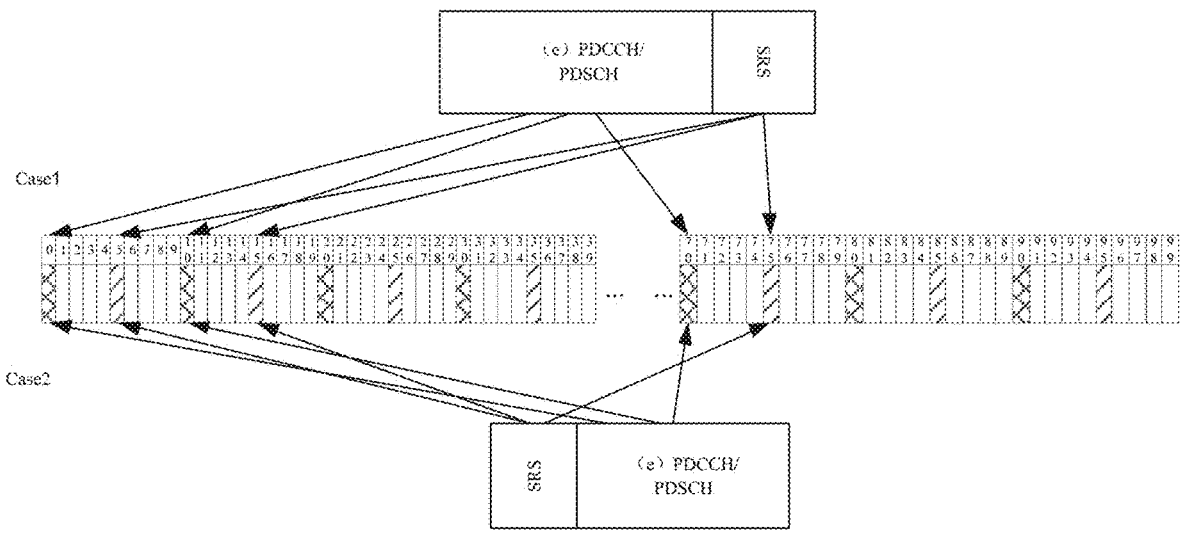
FIG. 17 is a schematic view showing a resource mapping situation for the SRS according to one embodiment of the present disclosure.

Step S161: determining first A symbols or second A symbols for an uplink transmission channel as positions of time-domain resources adopted by an uplink control channel for the transmission of the SRS, A being a positive integer. As shown in FIG. 17, the uplink transmission channel includes a PUSCH/MF-ePUCCH. The first A or second A symbols within a PUSCH/MF-ePUCCH subframe are determined as the uplink control channel for the transmission of the SRS, i.e., the SRS may be transmitted on either the first A symbols or the second A symbols within the PUSCH/MF-ePUCCH subframe in the time domain.

Step S162: mapping the SRS to the first A symbols or the second A symbols for the uplink control channel in such a manner that frequency-domain resource positions occupied by the first A symbols or the second A symbols are different from frequency-domain resource positions occupied by the other symbols for the uplink transmission channel, and transmitting the SRS to a base station.

In other words, as shown in FIG. 17, within a same subframe, the frequency-domain resource positions occupied by the other data transmitted through the PUSCH/MF-ePUCCH are different from the frequency-domain resource positions occupied by the SRS. In this way, it is able to increase a density of the frequency-domain resources for the transmission of the reference signals through transmitting the SRS together with the other control signals (e.g., DMRS) on the PUSCH/MF-ePUCCH, thereby to increase the channel estimation accuracy.

For example, when the SRS and the PUSCH/MF-ePUCCH for a same UE are transmitted within a same subframe and the SRS adopts a B-IFDMA mode or an IFDMA mode where the subcarrier interval in one interlace unit is 2 bits, the interlace unit occupied by the SRS maybe different from that occupied by the PUSCH/MF-ePUCCH. In the time domain, the SRS may be located after (case 1) or before (case 2) the PUSCH/MF-ePUCCH. In the frequency domain, the interlace unit occupied by the SRS may have an intermediate frequency between the frequencies of the resources occupied by the PUSCH/MF-ePUCCH. Through transmitting the SRS together with the other control signals (e.g., DMRS) on the PUSCH/MF-ePUCCH, it is able to increase a density of the frequency-domain resources for the transmission of the reference signals, thereby to increase the channel estimation accuracy.

Figure 18:
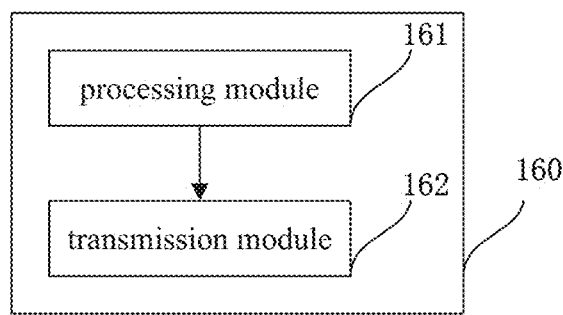
FIG. 18 is another block diagram of the device for transmitting the SRS according to one embodiment of the present disclosure.

The present disclosure further provides in some embodiments a device 180 for transmitting an SRS which, as shown in FIG. 18, includes: a processing module 181 configured to determine a position of a resource adopted by an uplink control channel for the transmission of the SRS; and a transmission module 182 configured to transmit the SRS to a base station through the resource adopted by the uplink control channel in such a manner that different frequency-domain resources are occupied by different time-domain resource symbols.

The transmission module 182 includes a transmission unit configured to map the SRS to different frequency-domain resources in different time-domain resources in accordance with a cyclic shift at a frequency-domain resource position and transmit the SRS to the base station. The cyclic shift at the frequency-domain resource position is determined in accordance with the quantity of time-domain resource symbols for the resource adopted by the uplink control channel and a frequency interval of the frequency-domain resource occupied by the SRS in a same time-domain resource.

The transmission unit includes: a first indication sub-unit configured to, when N time-domain resource symbols are occupied by the resource adopted by the uplink control channel and M interlace units are occupied on one time-domain resource symbol, indicate the different time-domain resource symbols in the N time-domain resource symbols of the SRS to occupy M different interlace units respectively, at all the frequency-domain resource positions occupied by the N time-domain resource symbols, the frequency interval between PRBs of the interlace units which are not adjacent and not consecutive in a frequency domain being determined in accordance with the cyclic shift at each frequency-domain resource position, M and N being each a positive integer; and a first transmission sub-unit configured to map the SRS to the resource adopted by the uplink control channel and transmit the SRS to the base station.

The transmission unit further includes: a second indication sub-unit configured to, when N time-domain resource symbols are occupied by the resource adopted by the uplink control channel and M interlace units are occupied on one time-domain resource symbol, divide every L adjacent time-domain resource symbols of the SRS into one group, indicate the time-domain resource symbols in each group to occupy a same interlace unit, and perform a time-domain orthogonal code division multiplexing operation, the interlace units occupied by the time-domain resource symbols in different groups having different frequencies, at all the frequency-domain resource positions occupied by the N time-domain resource symbols, the frequency interval between PRBs of the interlace units which are not adjacent and not consecutive in a frequency domain being determined in accordance with the cyclic shift at each frequency-domain resource position, M, N and L being each a positive integer; and a second transmission sub-unit configured to map the SRS to the resource adopted by the uplink control channel and transmit the SRS to the base station.

The transmission unit further includes: a third indication sub-unit configured to, when N time-domain resource symbols are occupied by the resource adopted by the uplink control channel, indicate each time-domain resource symbol of the SRS to occupy a combination of M interlace units which are consecutive in the frequency domain and which have not been allocated yet, at all the frequency-domain resource positions occupied by the N time-domain resource symbols, the frequency interval between PRBs of the combination of the interlace units which are not adjacent and not consecutive in the frequency domain being determined in accordance with the cyclic shift at each frequency-domain resource position, M and N being each a positive integer; and a third transmission sub-unit configured to map the SRS to the resource adopted by the uplink control channel and transmit the SRS to the base station.

The transmission unit further includes: a fourth indication sub-unit configured to, when N time-domain resource symbols are occupied by the resource adopted by the uplink control channel, indicate different time-domain resource symbols in the N time-domain resource symbols of the SRS to occupy M interlace units which have not been allocated for the other channels yet respectively, at all the frequency-domain resource positions occupied by the N time-domain resource symbols, the frequency interval between PRBs of the interlace units which are not adjacent and not consecutive in the frequency domain being determined in accordance with the cyclic shift at each frequency-domain resource position, M and N being each a positive integer; and a fourth transmission sub-unit configured to map the SRS to the resource adopted by the uplink control channel and transmit the SRS to the base station.

The processing module 181 further includes a processing unit configured to determine first A symbols or second A symbols for an uplink transmission channel as positions of time-domain resources adopted by an uplink control channel for the transmission of the SRS, and A is a positive integer.

The transmission module 182 further includes a transmission unit configured to map the SRS to the first A symbols or the second A symbols for the uplink control channel in such a manner that frequency-domain resource positions occupied by the first A symbols or the second A symbols are different from frequency-domain resource positions occupied by the other symbols for the uplink transmission channel, and transmit the SRS to the base station.

Figure 19:
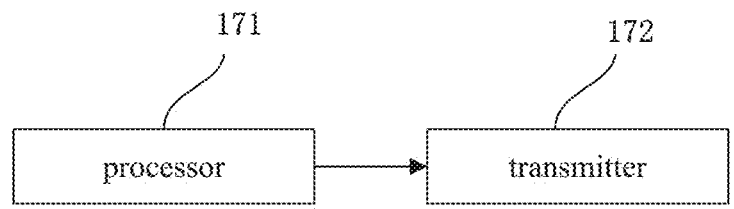
FIG. 19 is another block diagram of the UE according to one embodiment of the present disclosure.

The present disclosure further provides in some embodiments a UE which, as shown in FIG. 19, includes: a processor 191 configured to determine a position of a resource adopted by an uplink control channel for the transmission of the SRS; and a transmitter 192 connected to the processor and configured to transmit the SRS to a base station through the resource adopted by the uplink control channel in such a manner that different frequency-domain resources are occupied by different time-domain resource symbols.

Figure 20:
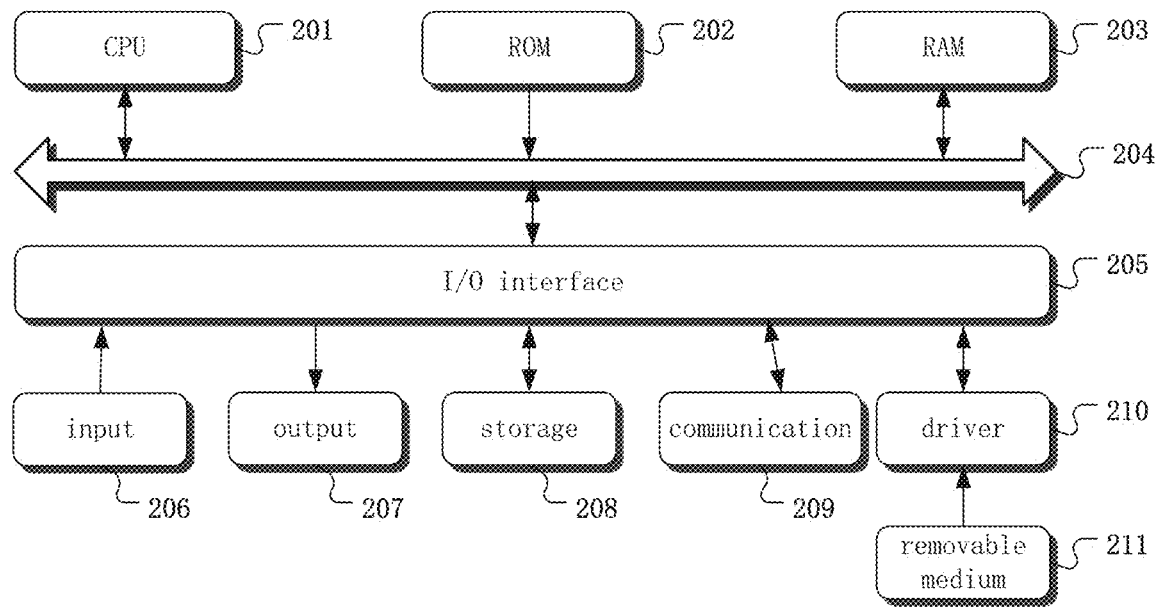
FIG. 20 is a schematic view showing a computer system adapted to implement the method or device for transmitting the SRS according to one embodiment of the present disclosure.

FIG. 20 shows a computer system 200 adapted to the device or UE in the embodiments of the present disclosure.

As shown in FIG. 20, the computer system 200 includes a Central Processing Unit (CPU) 201 capable of executing various appropriate operations and processings in accordance with a program stored in a Read Only Memory (ROM) 202 or a program loaded from a storage section 208 to a Random Access Memory (RAM) 203. Various programs and data for the operation of the computer system 200 are stored in the RAM 203. The CPU 201, the ROM 202 and the RAM 203 are connected to each other via a bus 204. In addition, an Input/Output (I/O) interface 205 is also connected to the bus 204.

The following members are connected to the I/O interface 205: an input section 206 including a keyboard and a mouse; an output section 207 including a Cathode Ray Tube (CRT), a Liquid Crystal Display (LCD) and a loudspeaker; the storage section 208 including a hard disc; and a communication section 209 including a network interface card such as a Local Access Network (LAN) card and a modem. The communication section 209 is configured to perform communication processings via a network such as Internet. A driver 210 may also be connected to the I/O interface 205 according to the practical need. A removable medium 211, e.g., a magnetic disk, an optical disk, a magneto-optical disk or a semiconductor memory, may be installed on the driver 210 according to the practical need, and a computer program stored therein may be loaded to the storage section 208.

Especially, the procedures described with reference to the flow charts may be implemented as a computer software program. For example, the present disclosure further provides in some embodiments a computer program product including a computer program physically contained in a computer-readable medium. The computer program includes a program code capable of being executed so as to implement the above-mentioned methods. The computer program may be loaded and installed from a network through the communication section 209, and/or installed from the removable medium 211.

Possible architecture, functions and operations of the system, method and computer program product in the embodiments of the present disclosure are shown in the flow charts and block diagrams. Each block in the flow charts or block diagrams may represent a part of a module, a program segment or a code. The part of the module, program segment or code may include one or more executable instructions for achieving a prescribed logical function. It should be appreciated that, in some substitutions, the steps represented by the blocks may be performed in an order different from that shown in the drawings. For example, the steps represented by two blocks connected to each other may actually be performed substantially simultaneously, or in an opposite order, depending on the functions involved therein. It should be also appreciated that, each block in the block diagrams and/or the flow charts, and a combination of the blocks may be implemented through a dedicated hardware-based system capable of achieving a prescribed function or operation, or through dedicated hardware in conjunction with a computer instruction.

The units or modules involved in the embodiments of the present disclosure may be implemented in the form of software or hardware. In addition, the units or modules may also be arranged in a processor. For example, the units may be software programs installed in a computer or a mobile smart electronic device, or hardware units arranged separately. Names of the units or modules shall not be construed as limiting the units or modules themselves in some cases. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, independently of each other.

A1. A method for transmitting an SRS, including: determining a position of a resource adopted by an uplink control channel for the transmission of the SRS; and transmitting the SRS to a base station through the resource adopted by h uplink control channel in such a manner that different frequency-domain resources are occupied by different time-domain resource symbols.

A2. The method according to A1, wherein the transmitting the SRS to the base station through the resource adopted by the uplink control channel in such a manner that different frequency-domain resources are occupied by different time-domain resource symbols includes mapping the SRS to different frequency-domain resources in different time-domain resources in accordance with a cyclic shift at a frequency-domain resource position and transmitting the SRS to the base station, wherein the cyclic shift at the frequency-domain resource position is determined in accordance with the quantity of time-domain resource symbols for the resource adopted by the uplink control channel and a frequency interval of the frequency-domain resource occupied by the SRS in a same time-domain resource.

A3. The method according to A2, wherein the mapping the SRS to different frequency-domain resources in different time-domain resources in accordance with the cyclic shift at the frequency-domain resource position and transmitting the SRS to the base station includes: when N time-domain resource symbols are occupied by the resource adopted by the uplink control channel and M interlace units are occupied on one time-domain resource symbol, indicating the different time-domain resource symbols in the N time-domain resource symbols of the SRS to occupy M different interlace units respectively; and mapping the SRS to the resource adopted by the uplink control channel and transmitting the SRS to the base station, wherein at all the frequency-domain resource positions occupied by the N time-domain resource symbols, the frequency interval between physical resource blocks of the interlace units which are not adjacent and not consecutive in a frequency domain is determined in accordance with the cyclic shift at each frequency-domain resource position, where M and N are each a positive integer.

A4. The method according to A2, wherein the mapping the SRS to different frequency-domain resources in different time-domain resources in accordance with the cyclic shift at the frequency-domain resource position and transmitting the SRS to the base station includes: when N time-domain resource symbols are occupied by the resource adopted by the uplink control channel and M interlace units are occupied on one time-domain resource symbol, dividing every L adjacent time-domain resource symbols of the SRS into one group, indicating the time-domain resource symbols in each group to occupy a same interlace unit, and performing a time-domain orthogonal code division multiplexing operation; and mapping the SRS to the resource adopted by the control channel and transmitting the SRS to the base station, wherein the interlace units occupied by the time-domain resource symbols in different groups have different frequencies, and at all the frequency-domain resource positions occupied by the N time-domain resource symbols, the frequency interval between physical resource blocks of the interlace units which are not adjacent and not consecutive in a frequency domain is determined in accordance with the cyclic shift at each frequency-domain resource position, where M, N and are each a positive integer.

A5. The method according to A2, wherein the mapping the SRS to different frequency-domain resources in different time-domain resources in accordance with the cyclic shift at the frequency-domain resource position and transmitting the SRS to the base station includes: when N time-domain resource symbols are occupied by the resource adopted by the uplink control channel, indicating each time-domain resource symbol of the SRS to occupy a combination of M interlace units which are consecutive in the frequency domain and which have not been allocated yet; and mapping the SRS to the resource adopted by the uplink control channel and transmitting the SRS to the base station, wherein at all the frequency-domain resource positions occupied by the N time-domain resource symbols, the frequency interval between physical resource blocks of the combination of the interlace units which are not adjacent and not consecutive in the frequency domain is determined in accordance with the cyclic shift at each frequency-domain resource position, where M and N are each a positive integer.

A6. The method according to A2, wherein the mapping the SRS to different frequency-domain resources in different time-domain resources in accordance with the cyclic shift at the frequency-domain resource position and transmitting the SRS to the base station includes: when N time-domain resource symbols are occupied by the resource adopted by the uplink control channel, indicating different time-domain resource symbols in the N time-domain resource symbols of the SRS to occupy M interlace units which have not been allocated for the other channels yet respectively; and mapping the SRS to the resource adopted by the uplink control channel and transmitting the SRS to the base station, wherein at all the frequency-domain resource positions occupied by the N time-domain resource symbols, the frequency interval between physical resource blocks of the interlace units which are not adjacent and not consecutive in the frequency domain is determined in accordance with the cyclic shift at each frequency-domain resource position, where M and N are each a positive integer.

A7. The method according to A1, wherein the determining the position of the resource adopted by the uplink control channel for the transmission of the SRS includes determining first A symbols or second A symbols for the uplink transmission channel as positions of time-domain resources adopted by the uplink control channel for the transmission of the SRS, wherein A is a positive integer.

A8. The method according to A7, wherein the transmitting the SRS to the base station through the resource adopted by the uplink control channel in such a manner that different frequency-domain resources are occupied by different time-domain resource symbols includes mapping the SRS to first A symbols or second A symbols for the uplink control channel in such a manner that frequency-domain resource positions occupied by the first A symbols or the second A symbols are different from frequency-domain resource positions occupied by the other symbols for the uplink transmission channel, and transmitting the SRS to the base station.

B1, A device for transmitting an SRS, including: a processing module configured to determine a position of a resource adopted by an uplink control channel for the transmission of the SRS; and a transmission module configured to transmit the SRS to a base station through the resource adopted by the uplink control channel in such a manner that different frequency-domain resources are occupied by different time-domain resource symbols.

C1. A UE, including: a processor configured to determine a position of a resource adopted by an uplink control channel for the transmission of an SRS; and a transmitter connected to the processor and configured to transmit the SRS to a base station through the resource adopted by the uplink control channel in such a manner that different frequency-domain resources are occupied by different time-domain resource symbols.

D1. A method for transmitting an SRS, including: acquiring scheduling information of an uplink transmission channel when the uplink transmission channel is being scheduled; determining a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal, and transmitting the SRS through the resource adopted by the uplink control channel.

D2. The method according to D1, wherein the acquiring the scheduling information of the uplink transmission channel when the uplink transmission channel is being scheduled includes acquiring the scheduling information of the uplink transmission channel from a base station when the uplink transmission channel is being scheduled.

D3. The method according to D1, wherein the determining the resource adopted by the uplink control channel corresponding to the scheduling information of the uplink transmission channel in accordance with the predetermined mapping relationship between the scheduling information of the uplink transmission channel and the resources adopted by the uplink control channel for the transmission of the uplink control signal includes determining a resource adopted by a non-scheduled uplink control channel corresponding to the scheduling information of the uplink transmission channel in accordance with the predetermined mapping relationship between the scheduling information of the uplink transmission channel and the resources adopted by the uplink control channel for the transmission of the uplink control signal.

D4. The method according to D1, wherein the scheduling information includes at least one of a serial number of a CCE or an ECCE, a serial number of a frequency-domain resource occupied by the uplink transmission channel when the uplink transmission channel is being scheduled, a serial number of a sequence and a serial number of a cyclic shift occupied by the uplink transmission channel when the uplink transmission channel is being scheduled, and a serial number of an OCC sequence occupied by the uplink transmission channel when the uplink transmission channel is being scheduled carried in uplink grant information about the uplink transmission channel, and the mapping relationship includes a mapping relationship between the scheduling information of the uplink transmission channel and a serial number of a resource adopted by the uplink control channel.

D5. The method according to D1, wherein the transmitting the SRS through the resource adopted by the uplink control channel includes transmitting the SRS to a base station through the resource adopted by the uplink control channel in such a manner that different frequency-domain resources are occupied by different time-domain resource symbols.

D6. The method according to D5, wherein the transmitting the SRS to the base station through the resource adopted by the uplink control channel in such a manner that different frequency-domain resources are occupied by different time-domain resource symbols includes mapping the SRS to different frequency-domain resources in different time-domain resources in accordance with a cyclic shift at a frequency-domain resource position and transmitting the SRS to the base station, wherein the cyclic shift at the frequency-domain resource position is determined in accordance with the quantity of time-domain resource symbols for the resource adopted by the uplink control channel and a frequency interval of the frequency-domain resource occupied by the SRS in a same time-domain resource.

D7. The method according to D6, wherein the mapping the SRS to different frequency-domain resources in different time-domain resources in accordance with the cyclic shift at the frequency-domain resource position and transmitting the SRS to the base station includes: when N time-domain resource symbols are occupied by the resource adopted by the uplink control channel and M interlace units are occupied on one time-domain resource symbol, indicating the different time-domain resource symbols in the N time-domain resource symbols of the SRS to occupy M different interlace units respectively; and mapping the SRS to the resource adopted by the uplink control channel and transmitting the SRS to the base station, wherein at all the frequency-domain resource positions occupied by the N time-domain resource symbols, the frequency interval between physical resource blocks of the interlace units which are not adjacent and not consecutive in a frequency domain is determined in accordance with the cyclic shift at each frequency-domain resource position, where M and N are each a positive integer.

D8. The method according to D6, wherein the mapping the SRS to different frequency-domain resources in different time-domain resources in accordance with the cyclic shift at the frequency-domain resource position and transmitting the SRS to the base station includes: when N time-domain resource symbols are occupied by the resource adopted by the uplink control channel and M interlace units are occupied on one time-domain resource symbol, dividing every L adjacent time-domain resource symbols of the SRS into one group, indicating the time-domain resource symbols in each group to occupy a same interlace unit, and performing a time-domain orthogonal code division multiplexing operation; and mapping the SRS to the resource adopted by the uplink control channel and transmitting the SRS to the base station, wherein the interlace units occupied by the time-domain resource symbols in different groups have different frequencies, and at all the frequency-domain resource positions occupied by the N time-domain resource symbols, the frequency interval between physical resource blocks of the interlace units which are not adjacent and not consecutive in a frequency domain is determined in accordance with the cyclic shift at each frequency-domain resource position, where M, N and L are each a positive integer.

D9. The method according to D6, wherein the mapping the SRS to different frequency-domain resources in different time-domain resources in accordance with the cyclic shift at the frequency-domain resource position and transmitting the SRS to the base station includes: when N time-domain resource symbols are occupied by the resource adopted by the uplink control channel, indicating each time-domain resource symbol of the SRS to occupy a combination of M interlace units which are consecutive in the frequency domain and which have not been allocated yet; and mapping the SRS to the resource adopted by the uplink control channel and transmitting the SRS to the base station, wherein at all the frequency-domain resource positions occupied by the N time-domain resource symbols, the frequency interval between physical resource blocks of the combination of the interlace units which are not adjacent and not consecutive in the frequency domain is determined in accordance with the cyclic shift at each frequency-domain resource position, where M and N are each a positive integer.

D10. The method according to D6, wherein the mapping the SRS to different frequency-domain resources in different time-domain resources in accordance with the cyclic shift at the frequency-domain resource position and transmitting the SRS to the base station includes: when N time-domain resource symbols are occupied by the resource adopted by the uplink control channel, indicating different time-domain resource symbols in the N time-domain resource symbols of the SRS to occupy M interlace units which have not been allocated for the other channels yet respectively; and mapping the SRS to the resource adopted by the uplink control channel and transmitting the SRS to the base station, wherein at all the frequency-domain resource positions occupied by the N time-domain resource symbols, the frequency interval between physical resource blocks of the interlace units which are not adjacent and not consecutive in the frequency domain is determined in accordance with the cyclic shift at each frequency-domain resource position, where M and N are each a positive integer.

D11. The method according to any one of D7 to D10, wherein the uplink transmission channel is a PUSCH or an MF-ePUCCH, and the uplink control channel is an MF-sPUCCH.

D12. The method according to D1, wherein the predetermined mapping relationship between the scheduling information of the uplink transmission channel and the resources adopted by the uplink control channel for the transmission of the uplink control signal includes a predetermined mapping relationship between the scheduling information of the uplink transmission channel and all the resources adopted by the uplink control channel for the transmission of the uplink control signal, or a predetermined mapping relationship between the scheduling information of the uplink transmission channel and non-scheduled resources adopted by the uplink control channel for the transmission of the uplink control signal.

D13. The method according to D3, wherein the determining the resource adopted by the non-scheduled uplink control channel corresponding to the scheduling information of the uplink transmission channel in accordance with the predetermined mapping relationship between the scheduling information of the uplink transmission channel and the resources adopted by the uplink control channel for the transmission of the uplink control signal includes: acquiring division information about scheduled resources and non-scheduled resources configured by the base station through RRC signaling or indicated by the base station through a CPDCCH; and determining the resource adopted by the non-scheduled uplink control channel corresponding to the scheduling information of the uplink transmission channel in accordance with the division information, the scheduling information and the predetermined mapping relationship between the scheduling information of the uplink transmission channel and the resources adopted by the uplink control channel for the transmission of the uplink control signal.

E14. A device for transmitting an SRS, including: an acquisition module configured to acquire scheduling information of an uplink transmission channel when the uplink transmission channel is being scheduled; a processing module configured to determine a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and a transmission module configured to determine the SRS through the resource adopted by the uplink control channel.

F15. A UE, including: a receiver configured to acquire scheduling information of an uplink transmission channel when the uplink transmission channel is being scheduled; a processor connected to the receiver and configured to determine a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and a transmitter connected to the processor and configured to transmit the SRS through the resource adopted by the uplink control channel.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for transmitting a Sounding Reference Signal (SRS), comprising: acquiring scheduling information of an uplink transmission channel when the uplink transmission channel is being scheduled; determining a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and transmitting the SRS through the resource adopted by the uplink control channel, wherein the transmitting the SRS through the resource adopted by the uplink control channel comprises: transmitting the SRS to a base station through the resource adopted by the uplink control channel in such a manner that different frequency-domain resources are occupied by different time-domain resource symbols, wherein the transmitting the SRS to the base station through the resource adopted by the uplink control channel in the manner that the different frequency-domain resources are occupied by the different time-domain resource symbols comprises: mapping the SRS to the different frequency-domain resources in different time-domain resources in accordance with a cyclic shift at a frequency-domain resource position and transmitting the SRS to the base station, wherein the cyclic shift at the frequency-domain resource position is determined in accordance with a quantity of time-domain resource symbols for the resource adopted by the uplink control channel and a frequency interval of the frequency-domain resource occupied by the SRS in a same time-domain resource, wherein the mapping the SRS to the different frequency-domain resources in the different time-domain resources in accordance with the cyclic shift at the frequency-domain resource position and transmitting the SRS to the base station comprises: indicating the different time-domain resource symbols in N time-domain resource symbols of the SRS to occupy M different interlace units respectively when the N time-domain resource symbols are occupied by the resource adopted by the uplink control channel and the M different interlace units are occupied on one time-domain resource symbol, when the N time-domain resource symbols are occupied by the resource adopted by the uplink control channel and the M different interlace units are occupied on one time-domain resource symbol; and mapping the SRS to the resource adopted by the uplink control channel and transmitting the SRS to the base station, wherein within all the frequency-domain resource positions occupied by the N time-domain resource symbols, the frequency interval between physical resource blocks of the M different interlace units which are not adjacent and not consecutive in a frequency domain is determined in accordance with the cyclic shift at each frequency-domain resource position, where M and N are each a positive integer.

2. The method according to claim 1, wherein the acquiring the scheduling information of the uplink transmission channel when the uplink transmission channel is being scheduled comprises:
acquiring the scheduling information of the uplink transmission channel from a base station when the uplink transmission channel is being scheduled.

3. The method according to claim 1, wherein the determining the resource adopted by the uplink control channel corresponding to the scheduling information of the uplink transmission channel in accordance with the predetermined mapping relationship between the scheduling information of the uplink transmission channel and the resources adopted by the uplink control channel for the transmission of the uplink control signal comprises:
determining a resource adopted by a non-scheduled uplink control channel corresponding to the scheduling information of the uplink transmission channel in accordance with the predetermined mapping relationship between the scheduling information of the uplink transmission channel and the resources adopted by the uplink control channel for the transmission of the uplink control signal.

4. The method according to claim 1, wherein
the scheduling information comprises at least one of a serial number of a control channel element (CCE) or an enhanced control channel element (ECCE), a serial number of a frequency-domain resource occupied by the uplink transmission channel when the uplink transmission channel is being scheduled, a serial number of a sequence and a serial number of a cyclic shift occupied by the uplink transmission channel when the uplink transmission channel is being scheduled, or a serial number of an Orthogonal Cover Code (OCC) sequence occupied by the uplink transmission channel when the uplink transmission channel is being scheduled carried in uplink grant information about the uplink transmission channel; and
the mapping relationship comprises a mapping relationship between the scheduling information of the uplink transmission channel and a serial number of the resource adopted by the uplink control channel.

5. The method according to claim 1, wherein the mapping the SRS to the different frequency-domain resources in the different time-domain resources in accordance with the cyclic shift at the frequency-domain resource position and transmitting the SRS to the base station comprises: dividing every L adjacent time-domain resource symbols of the SRS into one group, indicating the time-domain resource symbols in each group to occupy a same interlace unit, and performing a time-domain orthogonal code division when the N time-domain resource symbols are occupied by the resource adopted by the uplink control channel and the M different interlace units are occupied on one time-domain resource symbol; and mapping the SRS to the resource adopted by the uplink control channel and transmitting the SRS to the base station, wherein the M different interlace units occupied by the time-domain resource symbols in different groups have different frequencies, and within all the frequency-domain resource positions occupied by the N time-domain resource symbols, the frequency interval between physical resource blocks of the M different interlace units which are not adjacent and not consecutive in a frequency domain is determined in accordance with the cyclic shift at each frequency-domain resource position, where M, N and L are each a positive integer.

6. The method according to claim 1, wherein the mapping the SRS to different frequency-domain resources in different time-domain resources in accordance with the cyclic shift at the frequency-domain resource position and transmitting the SRS to the base station comprises: indicating each time-domain resource symbol of the SRS to occupy a combination of M different interlace units which are consecutive in the frequency domain and which have not been allocated when the N time-domain resource symbols are occupied by the resource adopted by the uplink control channel; and mapping the SRS to the resource adopted by the uplink control channel and transmitting the SRS to the base station, wherein within all the frequency-domain resource positions occupied by the N time-domain resource symbols, the frequency interval between physical resource blocks of the combination of the M different interlace units which are not adjacent and not consecutive in the frequency domain is determined in accordance with the cyclic shift at each frequency-domain resource position, where M and N are each a positive integer.

7. The method according to claim 1, wherein the mapping the SRS to the different frequency-domain resources in the different time-domain resources in accordance with the cyclic shift at the frequency-domain resource position and transmitting the SRS to the base station comprises: indicating the different time-domain resource symbols in the N time-domain resource symbols of the SRS to occupy M different interlace units which are different and have not been allocated for the other channels respectively when the N time-domain resource symbols are occupied by the resource adopted by the uplink control channel; and mapping the SRS to the resource adopted by the uplink control channel and transmitting the SRS to the base station, wherein within all the frequency-domain resource positions occupied by the N time-domain resource symbols, the frequency interval between physical resource blocks of the M different interlace units which are not adjacent and not consecutive in the frequency domain is determined in accordance with the cyclic shift at each frequency-domain resource position, where M and N are each a positive integer.

8. The method according to claim 1, wherein the uplink transmission channel is a Physical Uplink Shared Channel (PUSCH) or an extended Physical Uplink Control Channel (ePUCCH), and the uplink control channel is a short Physical Uplink Control Channel (sPUCCH).

9. The method according to claim 1, wherein the predetermined mapping relationship between the scheduling information of the uplink transmission channel and the resources adopted by the uplink control channel for the transmission of the uplink control signal comprises: a predetermined mapping relationship between the scheduling information of the uplink transmission channel and all the resources adopted by the uplink control channel for the transmission of the uplink control signal, or a predetermined mapping relationship between the scheduling information of the uplink transmission channel and non-scheduled resources adopted by the uplink control channel for the transmission of the uplink control signal.

10. The method according to claim 3, wherein the determining the resource adopted by the non-scheduled uplink control channel corresponding to the scheduling information of the uplink transmission channel in accordance with the predetermined mapping relationship between the scheduling information of the uplink transmission channel and the resources adopted by the uplink control channel for the transmission of the uplink control signal comprises:
acquiring division information about scheduled resources and non-scheduled resources configured by the base station through Radio Resource Control (RRC) signaling or indicated by the base station through a Common Physical Downlink Control Channel (CPDCCH); and
determining the resource adopted by the non-scheduled uplink control channel corresponding to the scheduling information of the uplink transmission channel in accordance with the division information, the scheduling information and the predetermined mapping relationship between the scheduling information of the uplink transmission channel and the resources adopted by the uplink control channel for the transmission of the uplink control signal.

11. The method according to claim 1, further comprising: prior to acquiring the scheduling information of the uplink transmission channel when the uplink transmission channel is being scheduled, performing a Listen Before Talk (LBT) mechanism.

12. The method according to claim 1, wherein the uplink control channel is an sPUCCH.

13. The method according to claim 1, wherein the predetermined mapping relationship between the scheduling information of the uplink transmission channel and the resources adopted by the uplink control channel for the transmission of the uplink control signal refers to a mapping relationship between an identifier of the resource adopted by the uplink transmission channel and an identifier of the resource adopted by the uplink control channel.

14. The method according to claim 1, wherein the transmitting the SRS through the resource adopted by the uplink control channel further comprises:
   transmitting the SRS through the uplink control channel in accordance with downlink control information when uplink scheduling transmission is merely performed on the uplink transmission channel immediately subsequent to the uplink control channel.

15. The method according to claim 14, wherein the transmitting the SRS through the uplink control channel when the uplink scheduling transmission is merely performed on the uplink transmission channel immediately subsequent to the uplink control channel comprises:
   transmitting the SRS within the subframe n-1 through the uplink control channel, when there is the uplink control channel within a subframe n-1, no uplink control information is transmitted within a subframe where the uplink control channel exists, and the downlink control information for scheduling the uplink transmission channel from a starting position of a subframe n is received within a subframe no later than a subframe n-4.

16. A device for transmitting an SRS, comprising: a processor; and a memory storing therein a computer-readable instruction, wherein the processor is configured to execute the computer-readable instruction, so as to: acquire scheduling information of an uplink transmission channel when the uplink transmission channel is being scheduled; determine a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and transmit the SRS through the resource adopted by the uplink control channel; wherein the processor is further configured to: transmit the SRS to a base station through the resource adopted by the uplink control channel in such a manner that different frequency-domain resources are occupied by different time-domain resource symbols; wherein the processor is further configured to: map the SRS to the different frequency-domain resources in different time-domain resources in accordance with a cyclic shift at a frequency-domain resource position and transmitting the SRS to the base station, wherein the cyclic shift at the frequency-domain resource position is determined in accordance with a quantity of time-domain resource symbols for the resource adopted by the uplink control channel and a frequency interval of the frequency-domain resource occupied by the SRS in a same time-domain resource; wherein the processor is further configured to: indicate the different time-domain resource symbols in N time-domain resource symbols of the SRS to occupy M different interlace units respectively when the N time-domain resource symbols are occupied by the resource adopted by the uplink control channel and the M different interlace units are occupied on one time-domain resource symbol, when the N time-domain resource symbols are occupied by the resource adopted by the uplink control channel and the M different interlace units are occupied on one time-domain resource symbol; and map the SRS to the resource adopted by the uplink control channel and transmitting the SRS to the base station, wherein within all the frequency-domain resource positions occupied by the N time-domain resource symbols, the frequency interval between physical resource blocks of the M different interlace units which are not adjacent and not consecutive in a frequency domain is determined in accordance with the cyclic shift at each frequency-domain resource position, where M and N are each a positive integer.

17. A UE, comprising a chip for transmitting an SRS, wherein the chip comprises a processor and a memory storing therein an instruction, wherein the processor is configured to execute the instruction, so as to: acquire scheduling information of an uplink transmission channel when the uplink transmission channel is being scheduled; determine a resource adopted by an uplink control channel corresponding to the scheduling information of the uplink transmission channel in accordance with a predetermined mapping relationship between the scheduling information of the uplink transmission channel and resources adopted by the uplink control channel for the transmission of an uplink control signal; and transmit the SRS through the resource adopted by the uplink control channel, wherein the processor is further configured to: transmit the SRS to a base station through the resource adopted by the uplink control channel in such a manner that different frequency-domain resources are occupied by different time-domain resource symbols; wherein the processor is further configured to: map the SRS to different frequency-domain resources in different time-domain resources in accordance with a cyclic shift at a frequency-domain resource position and transmitting the SRS to the base station, wherein the cyclic shift at the frequency-domain resource position is determined in accordance with a quantity of time-domain resource symbols for the resource adopted by the uplink control channel and a frequency interval of the frequency-domain resource occupied by the SRS in a same time-domain resource; wherein the processor is further configured to: indicate the different time-domain resource symbols in N time-domain resource symbols of the SRS to occupy M different interlace units respectively when the N time-domain resource symbols are occupied by the resource adopted by the uplink control channel and the M different interlace units are occupied on one time-domain resource symbol, when the N time-domain resource symbols are occupied by the resource adopted by the uplink control channel and the M different interlace units are occupied on one time-domain resource symbol; and map the SRS to the resource adopted by the uplink control channel and transmitting the SRS to the base station, wherein within all the frequency-domain resource positions occupied by the N time-domain resource symbols, the frequency interval between physical resource blocks of the M different interlace units which are not adjacent and not consecutive in a frequency domain is determined in accordance with the cyclic shift at each frequency-domain resource position, where M and N are each a positive integer.

* * * * *